Dec. 21, 1954  G. A. MONTOOTH ET AL  2,697,605
MACHINE FOR SETTING PINS ON BOWLING ALLEYS
Filed March 26, 1946  22 Sheets-Sheet 2

INVENTORS
GEORGE A. MONTOOTH
ALBERT M. BOWEN
BY
C. G. Stratton
ATTORNEY

Dec. 21, 1954 G. A. MONTOOTH ET AL 2,697,605
MACHINE FOR SETTING PINS ON BOWLING ALLEYS
Filed March 26, 1946 22 Sheets-Sheet 3

Fig. 3.

INVENTORS
GEORGE A. MONTOOTH.
ALBERT M. BOWEN.
BY
C. G. Stratton
ATTORNEY

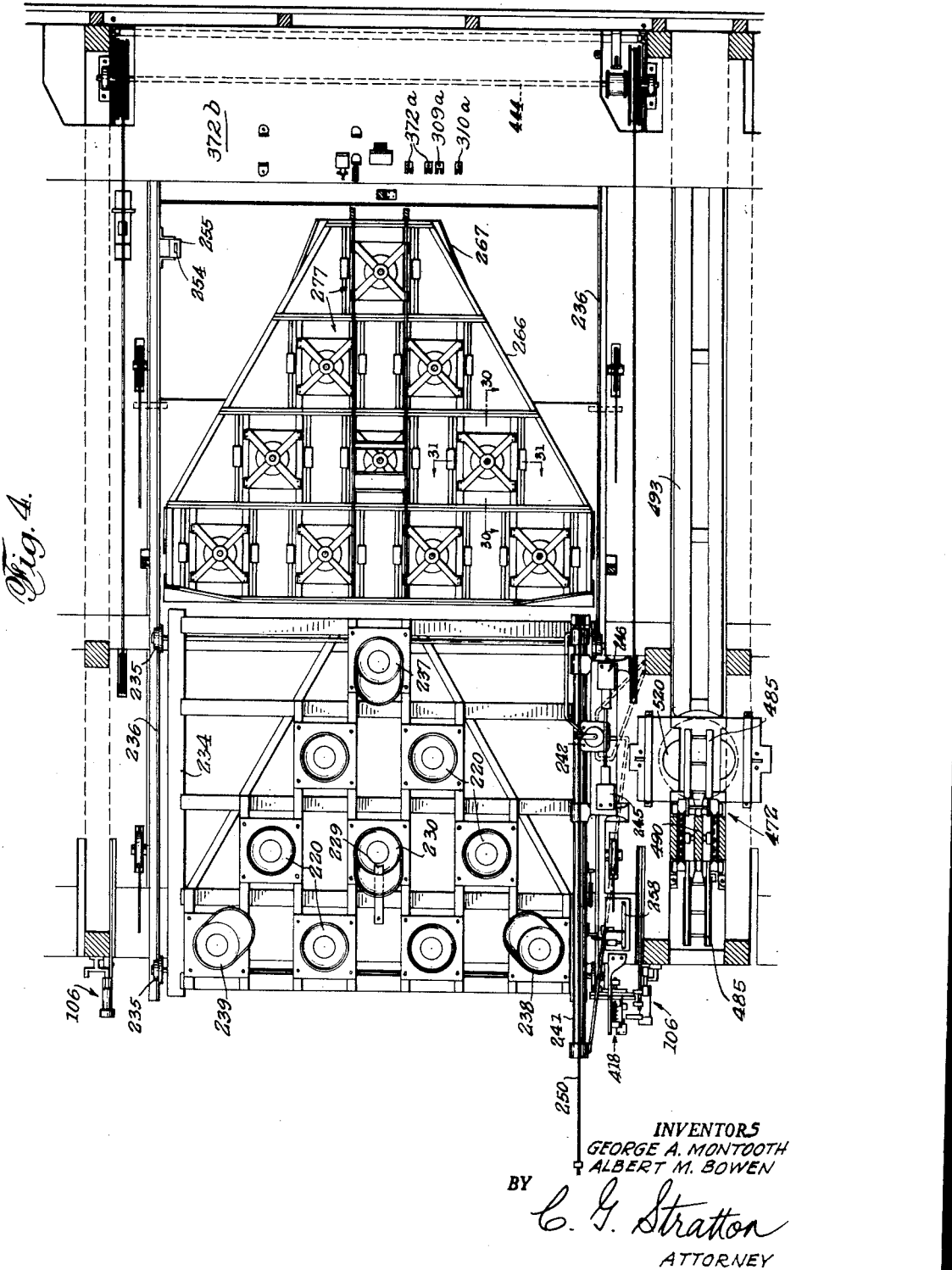

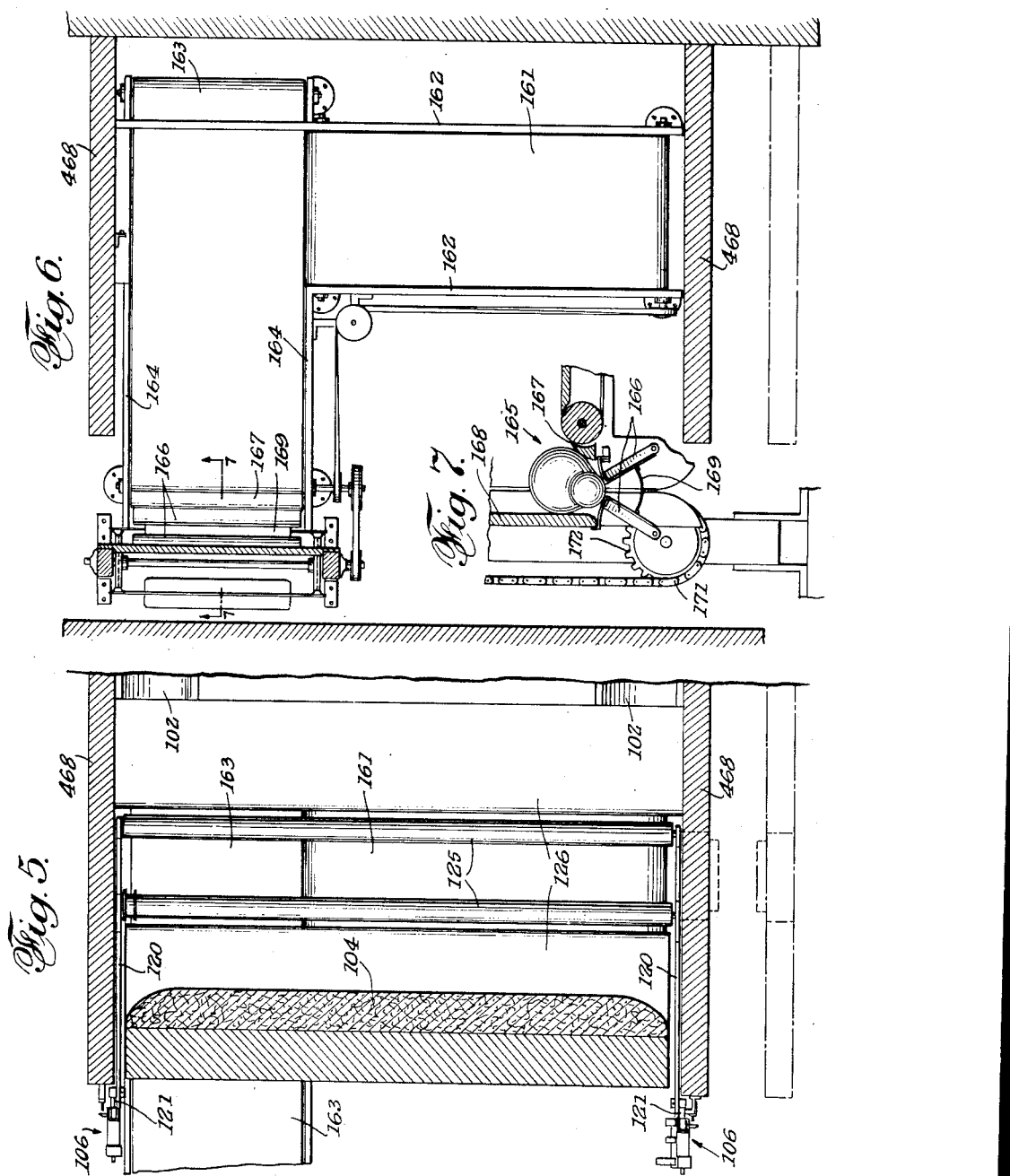

Dec. 21, 1954  G. A. MONTOOTH ET AL  2,697,605
MACHINE FOR SETTING PINS ON BOWLING ALLEYS
Filed March 26, 1946  22 Sheets-Sheet 6

INVENTORS
GEORGE A. MONTOOTH
ALBERT M. BOWEN
BY
C. G. Stratton
ATTORNEY

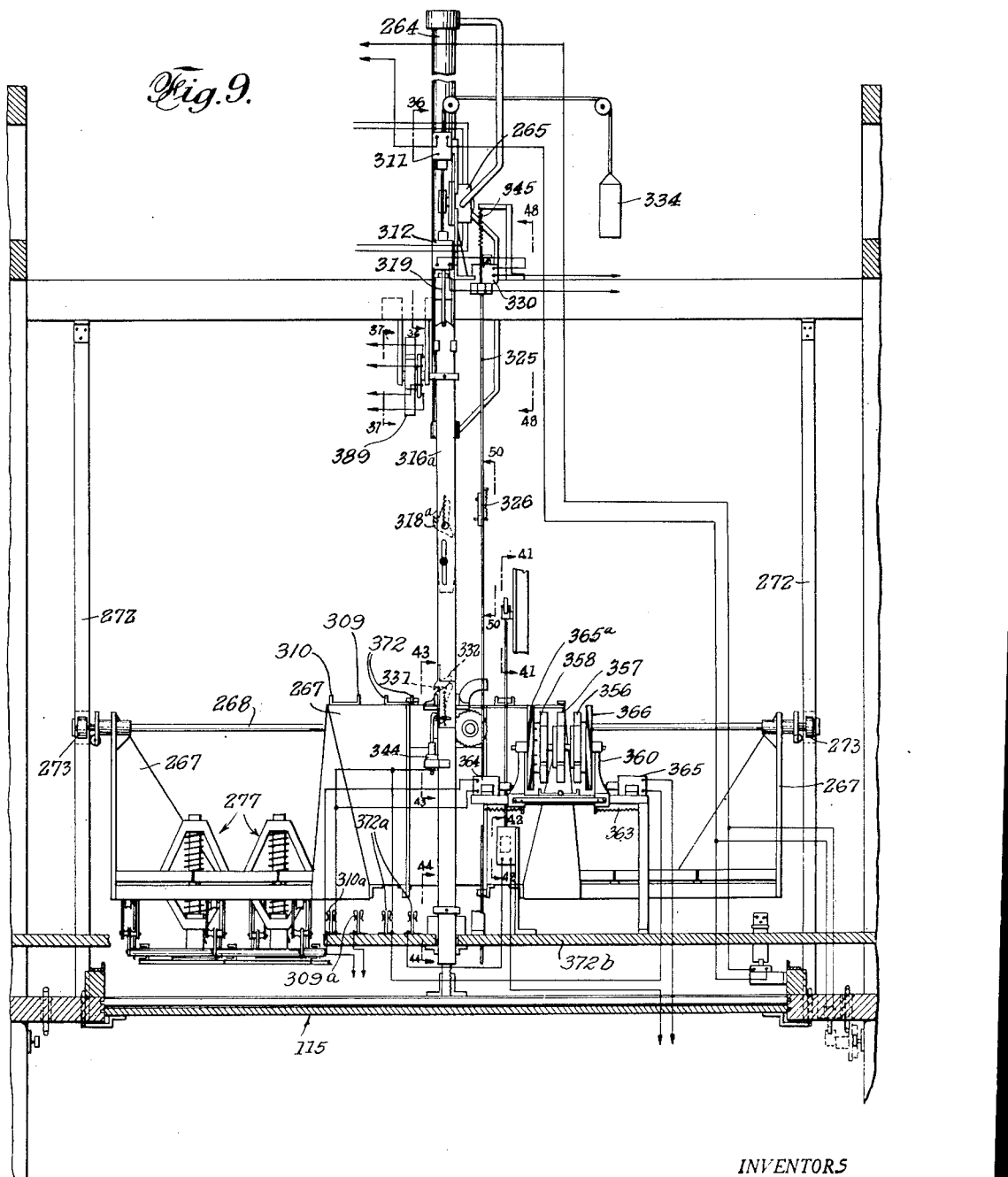

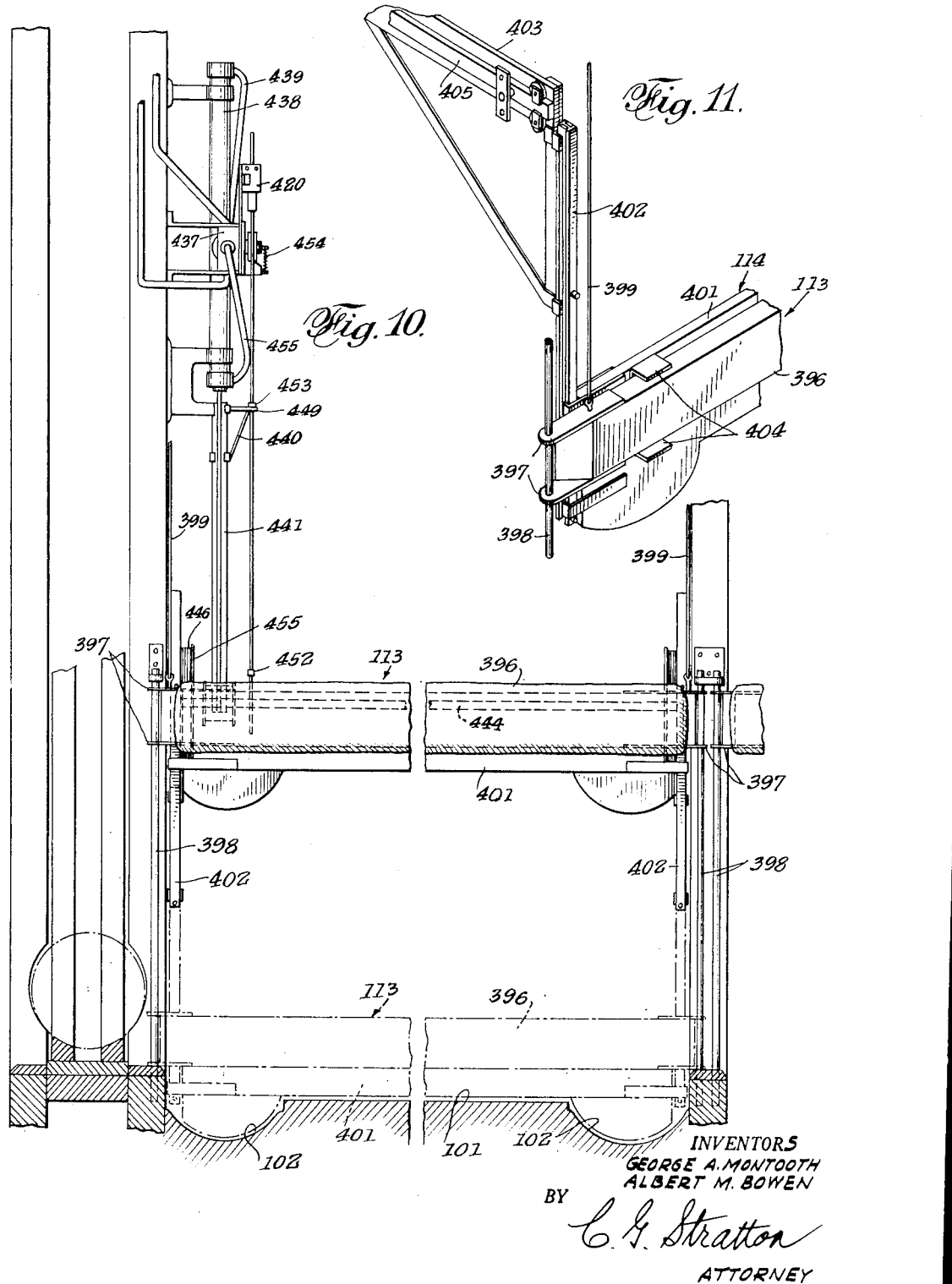

Dec. 21, 1954
G. A. MONTOOTH ET AL
2,697,605
MACHINE FOR SETTING PINS ON BOWLING ALLEYS
Filed March 26, 1946
22 Sheets-Sheet 9
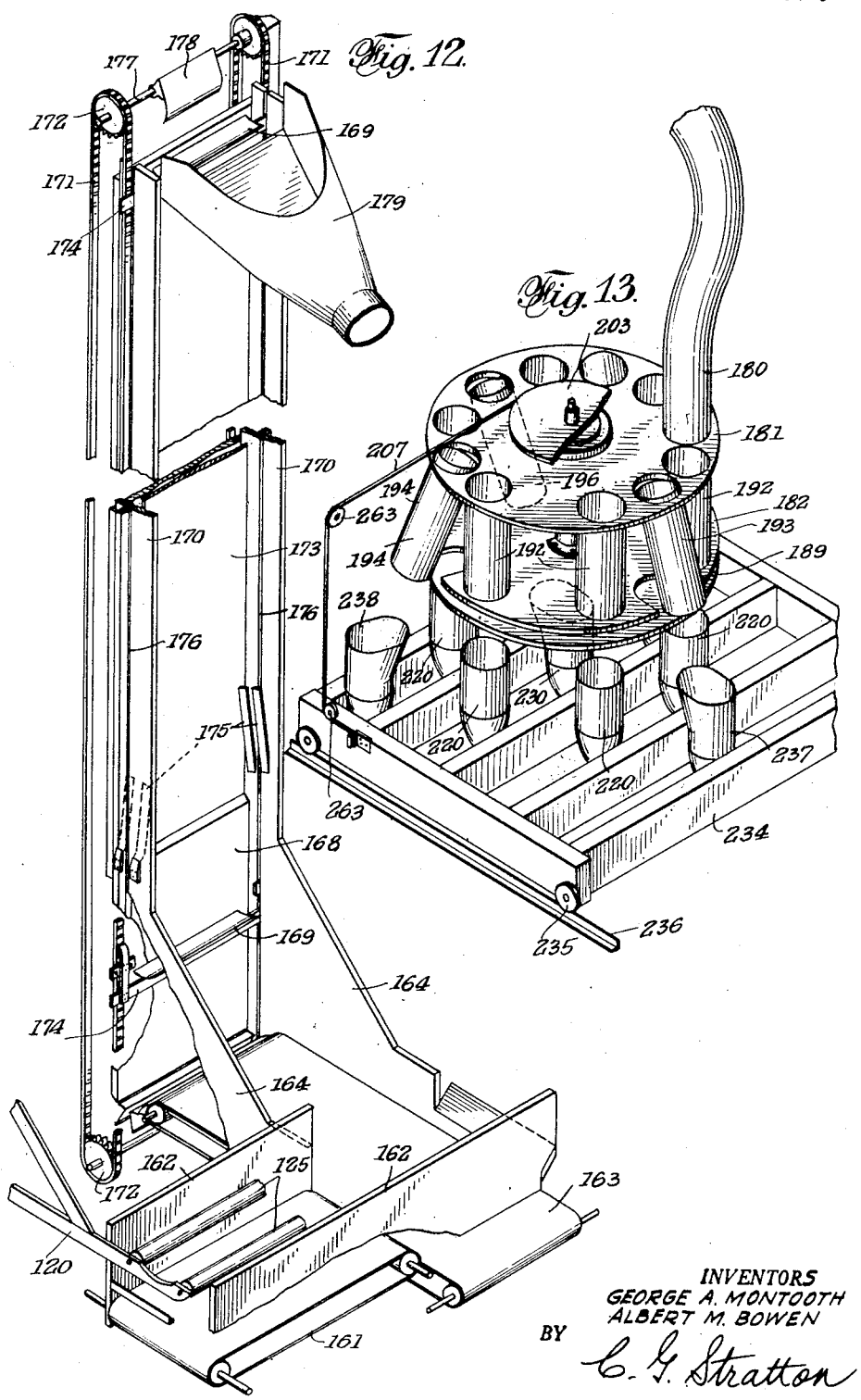
INVENTORS
GEORGE A. MONTOOTH
ALBERT M. BOWEN
BY
C. G. Stratton
ATTORNEY

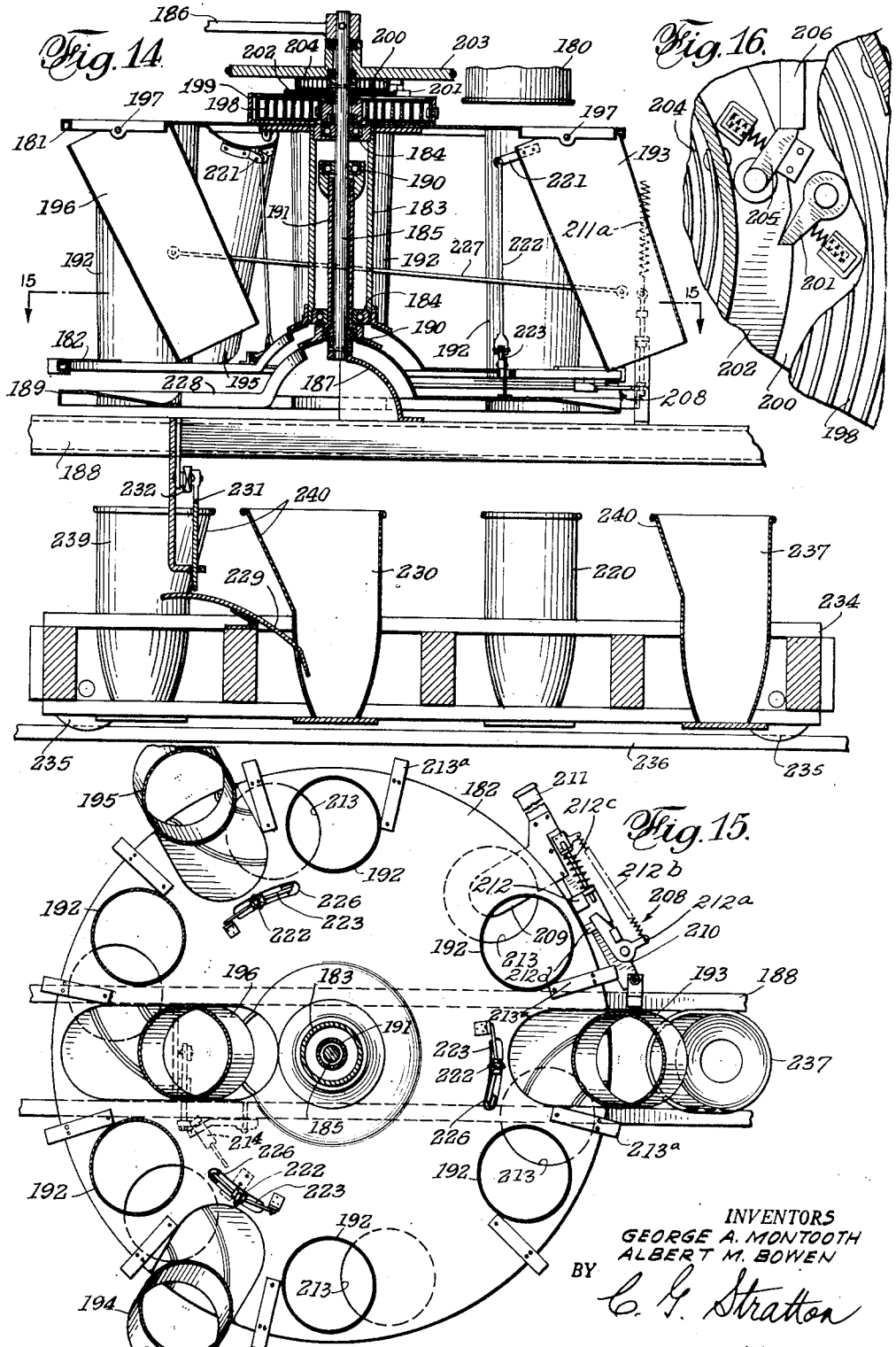

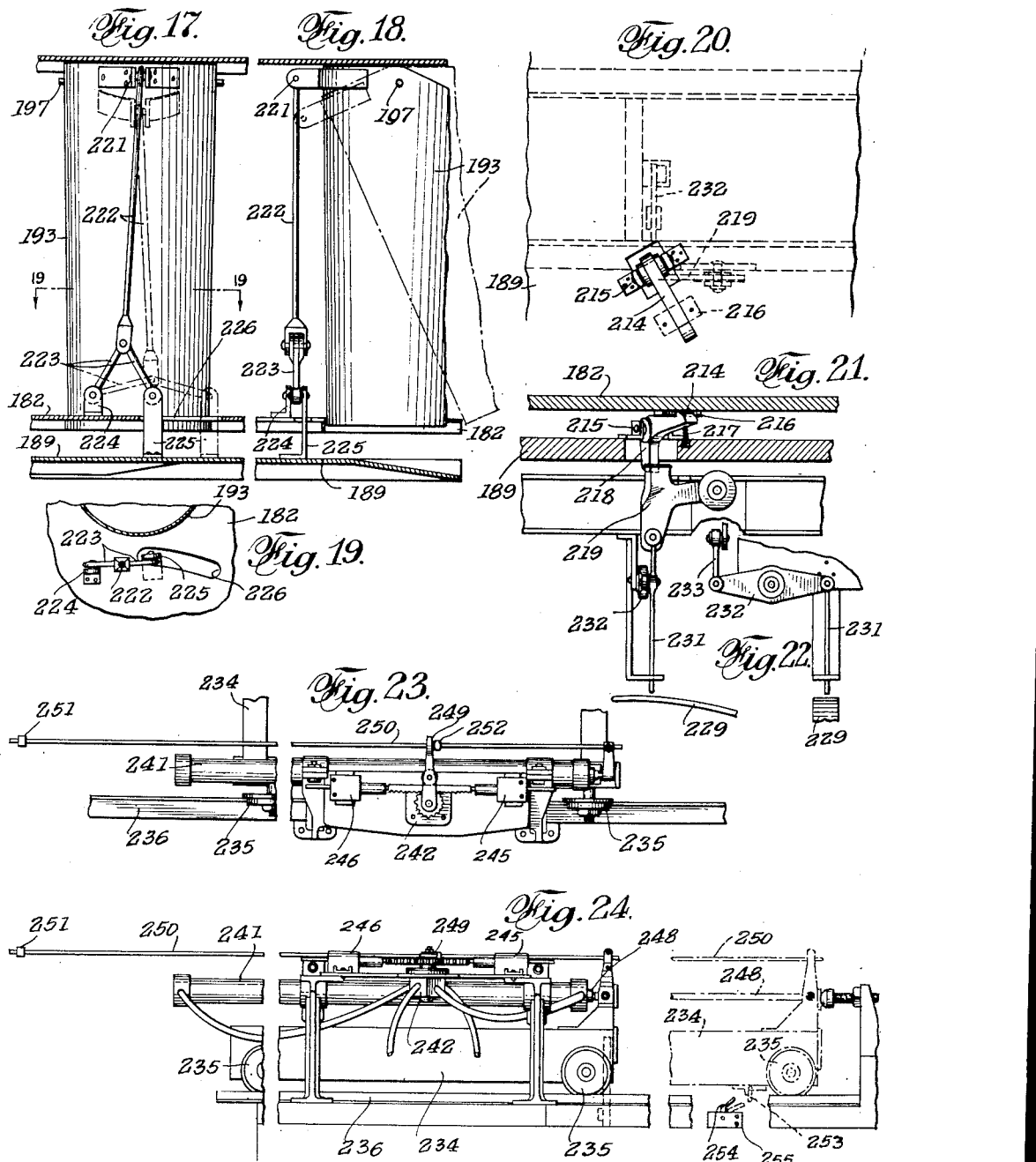

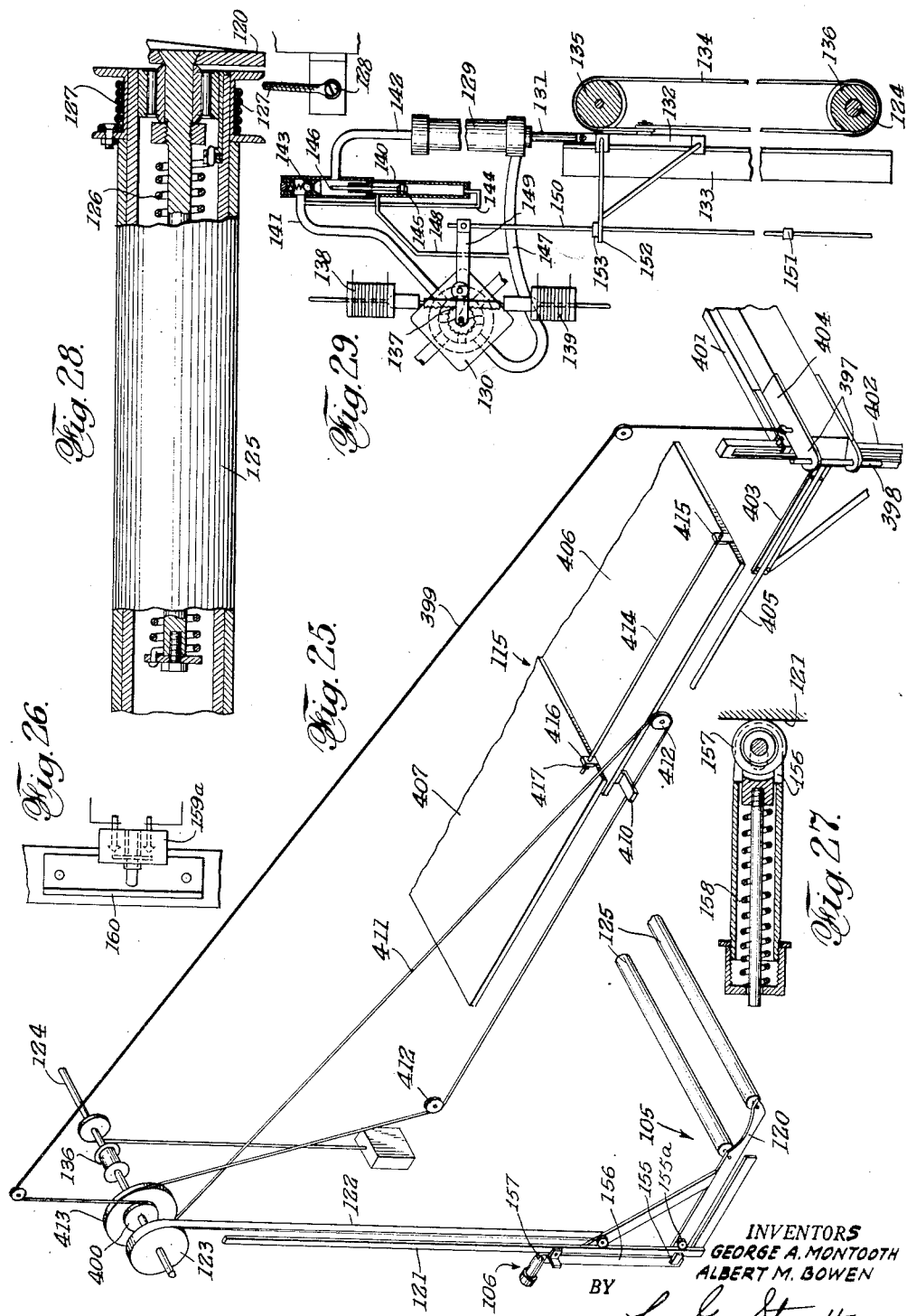

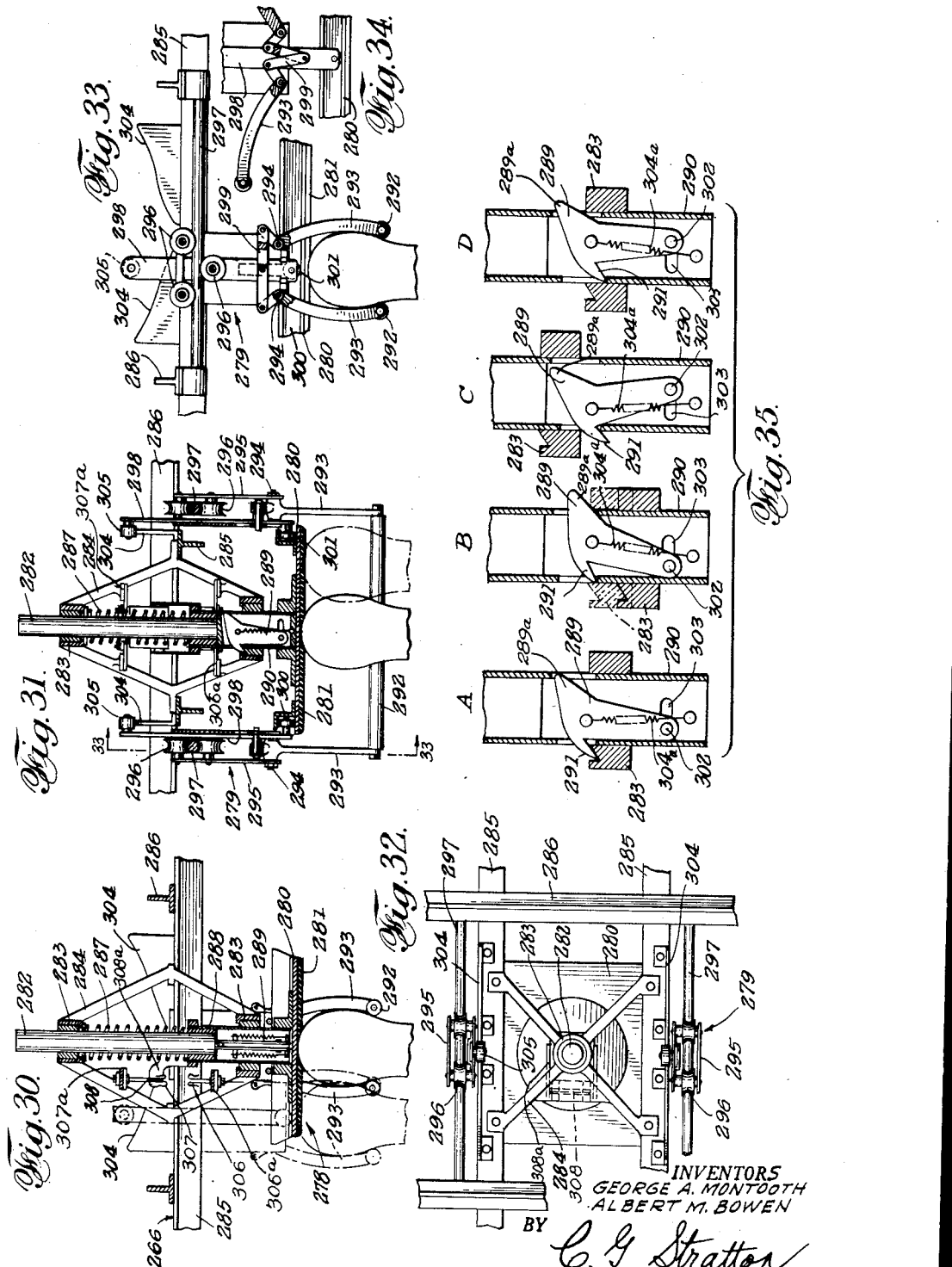

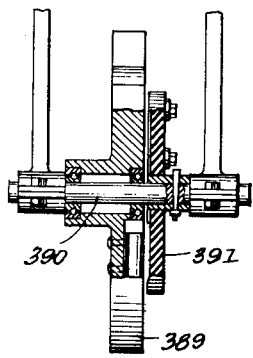
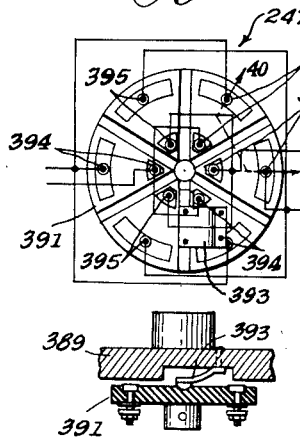
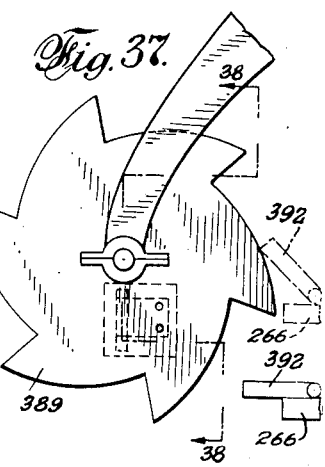
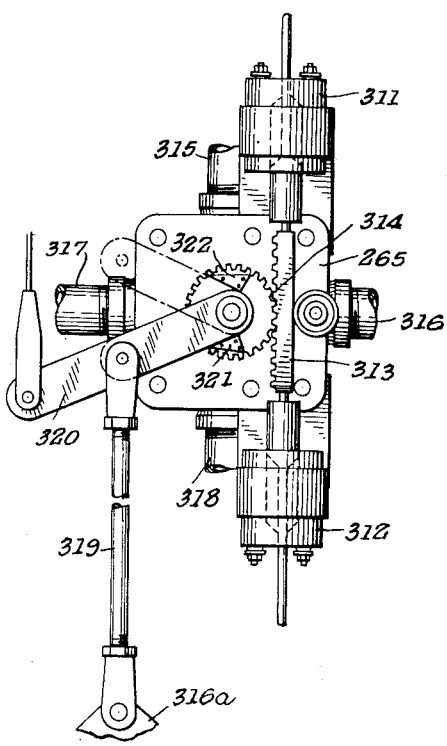
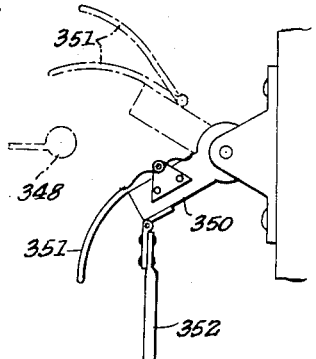
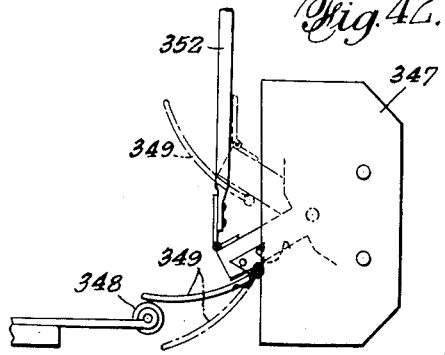

Dec. 21, 1954  G. A. MONTOOTH ET AL  2,697,605
MACHINE FOR SETTING PINS ON BOWLING ALLEYS
Filed March 26, 1946                           22 Sheets-Sheet 15
Fig. 45.      Fig. 43.
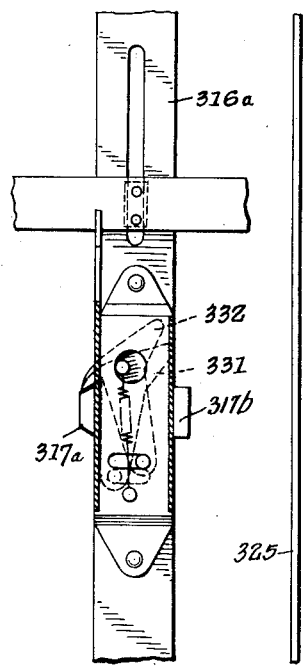
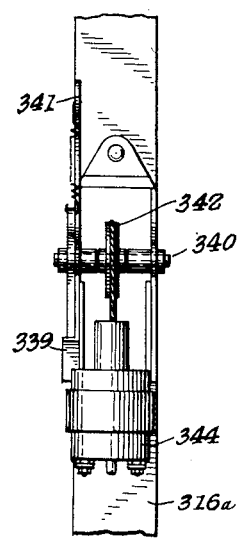
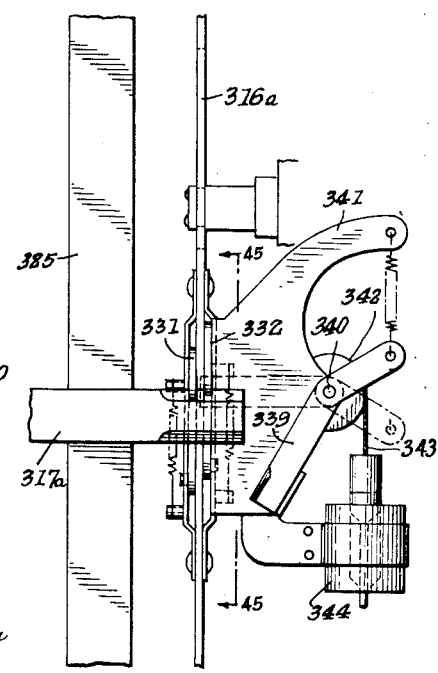
Fig. 46.
Fig. 47.      Fig. 44.
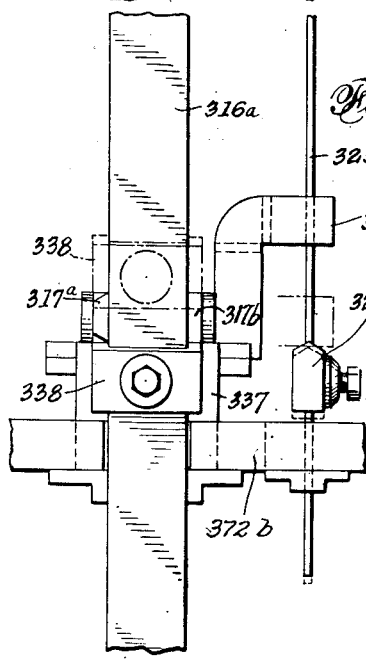
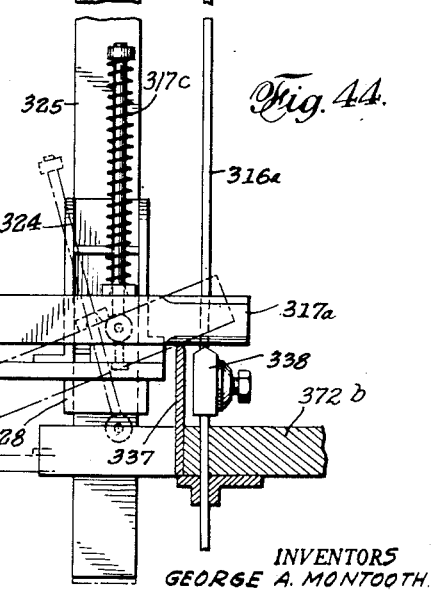
INVENTORS
GEORGE A. MONTOOTH
ALBERT M. BOWEN
BY
C. G. Stratton
ATTORNEY

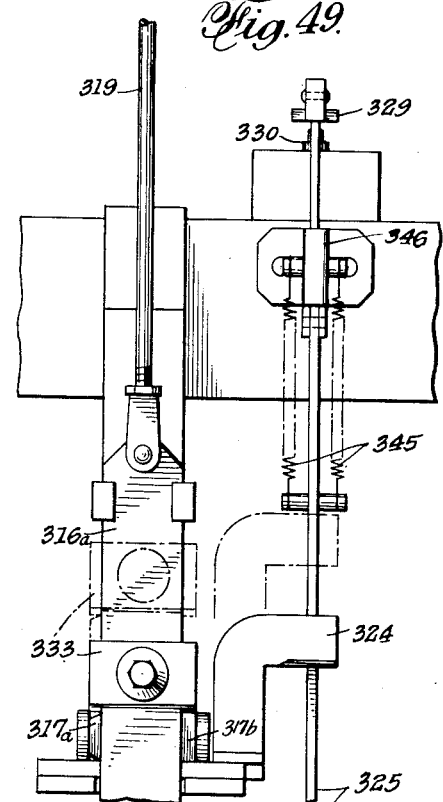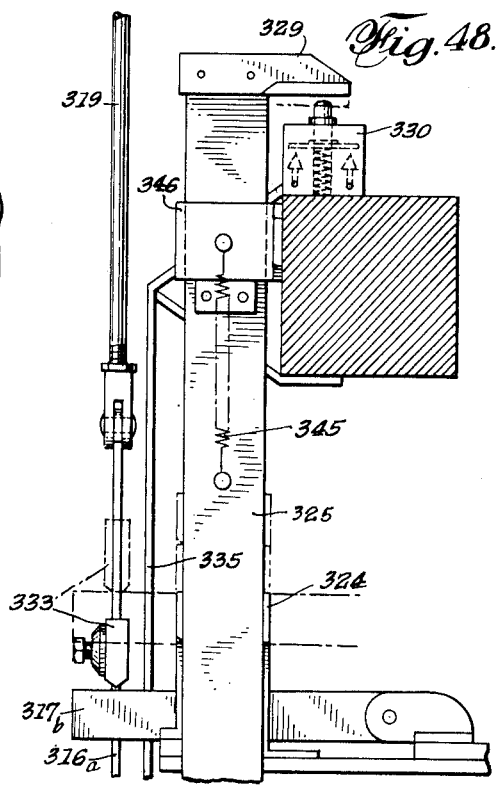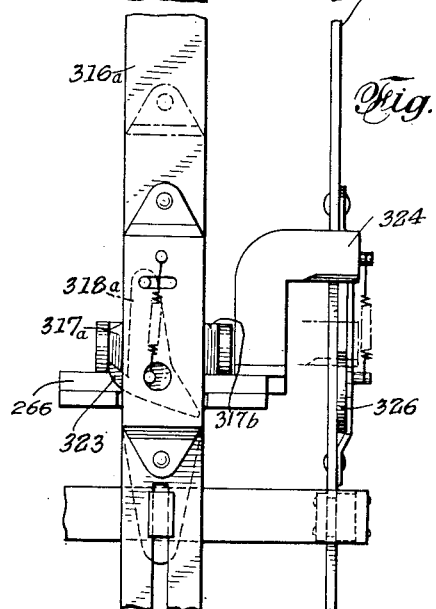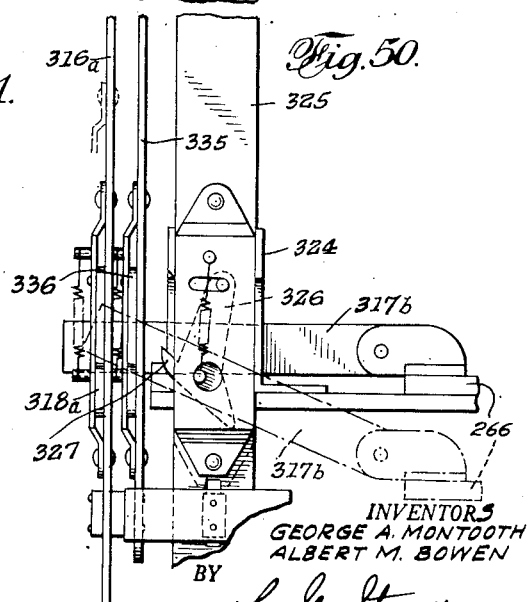

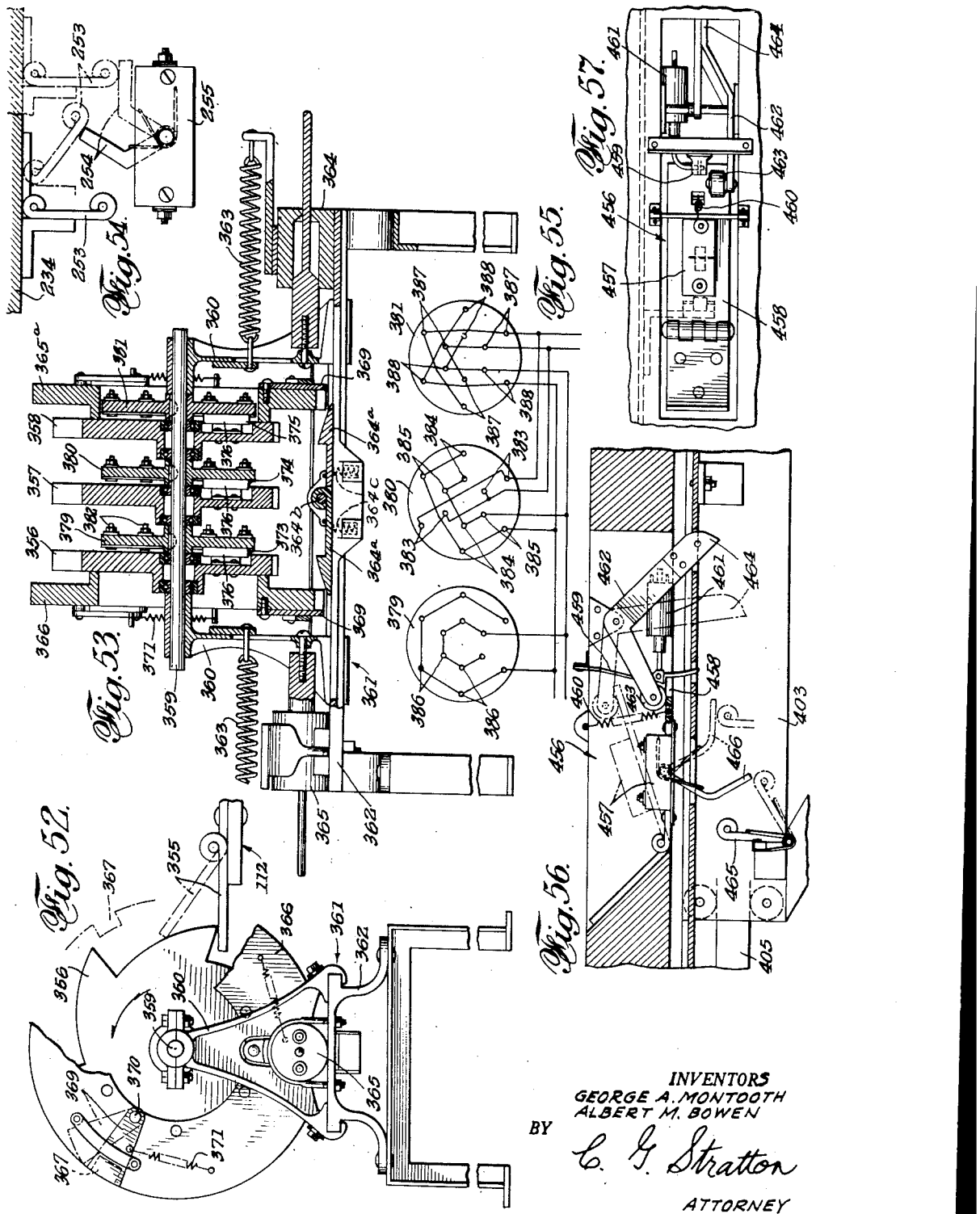

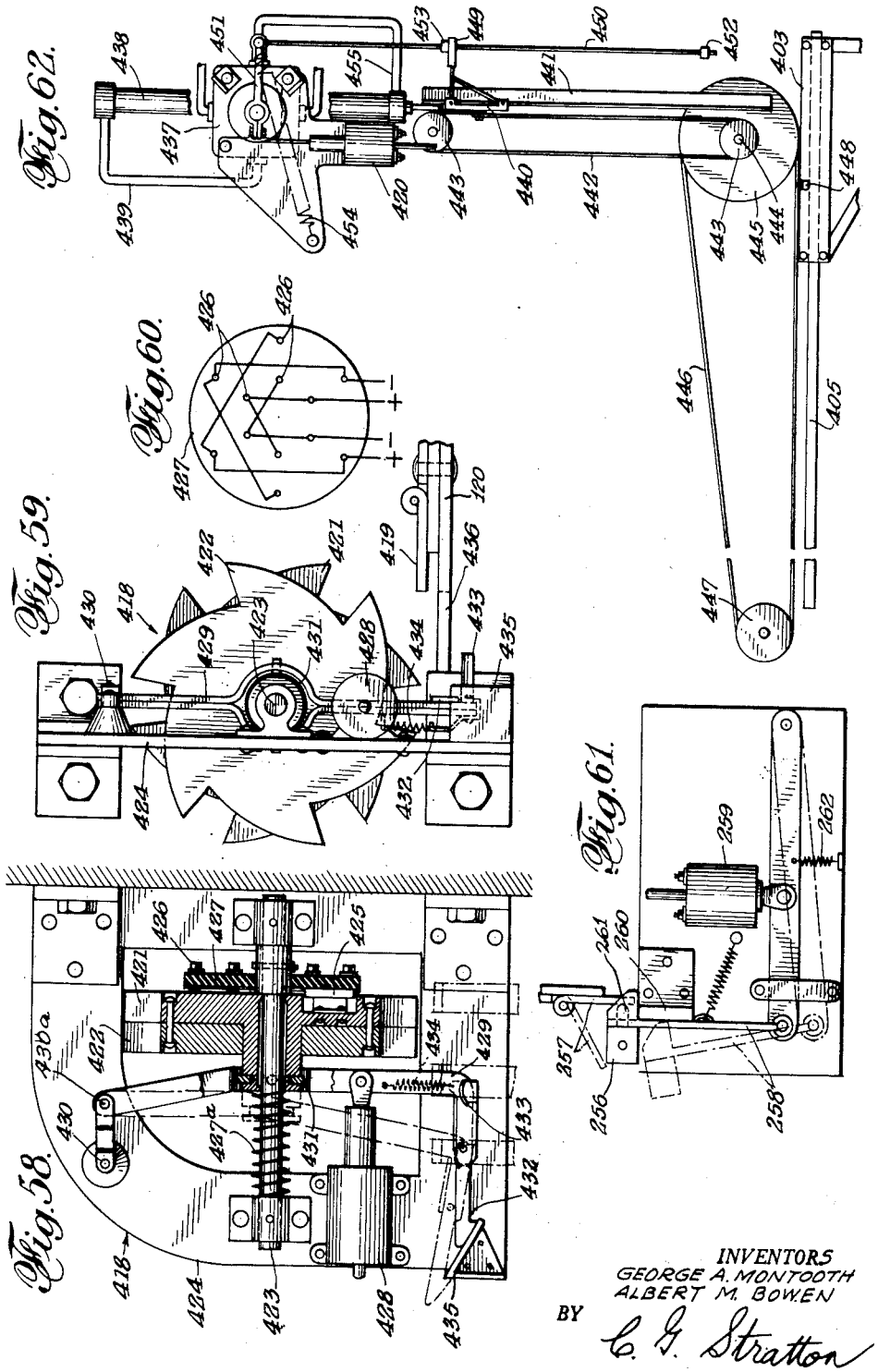

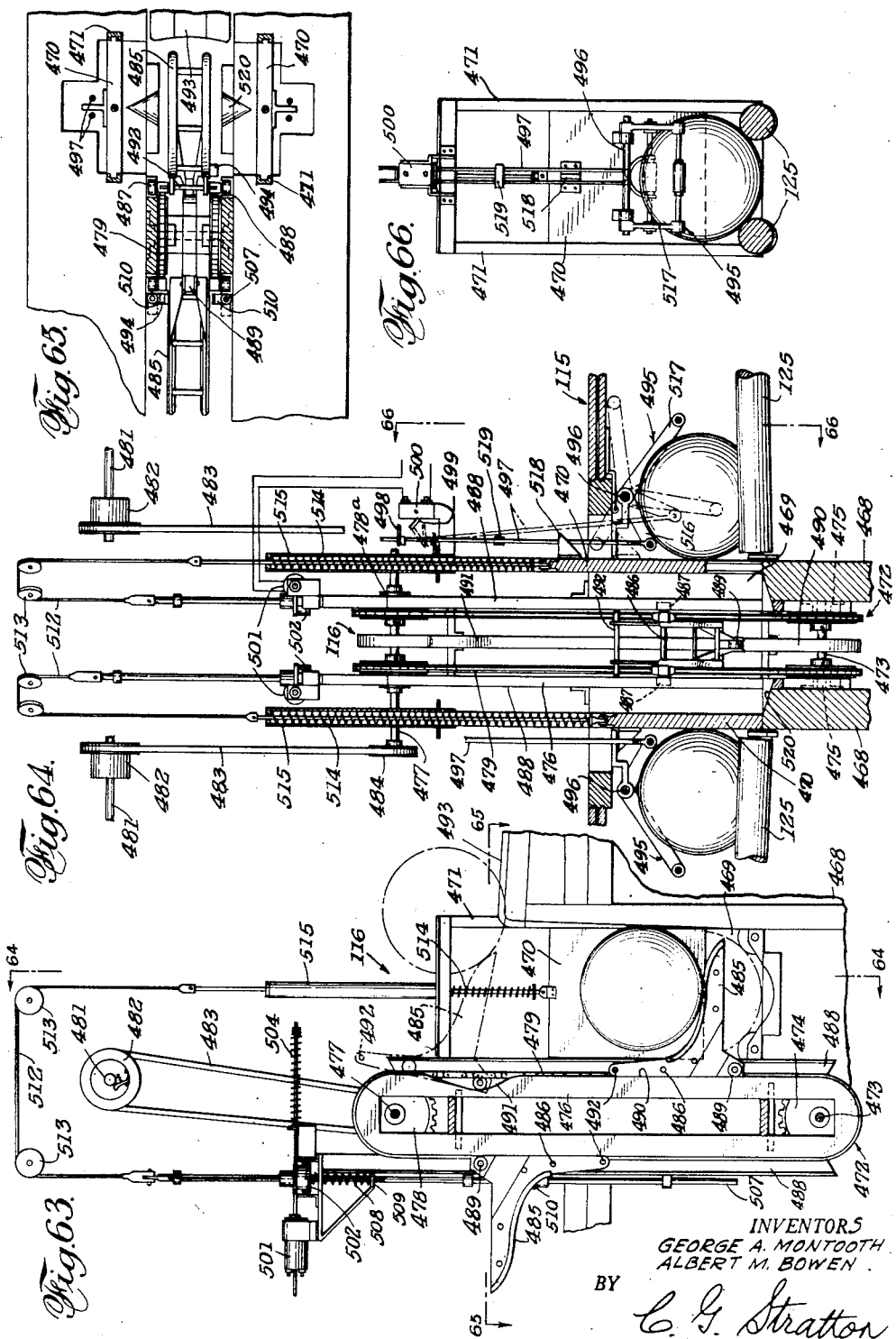

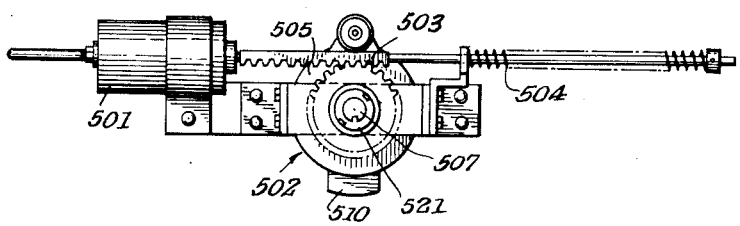
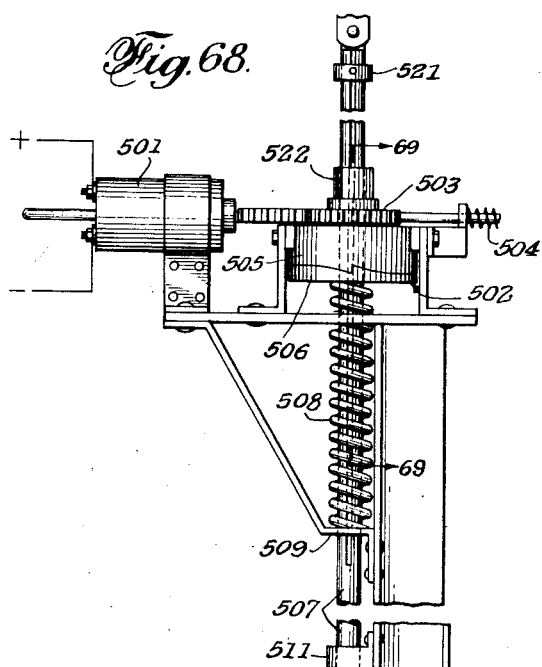
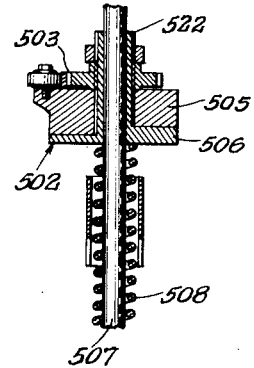
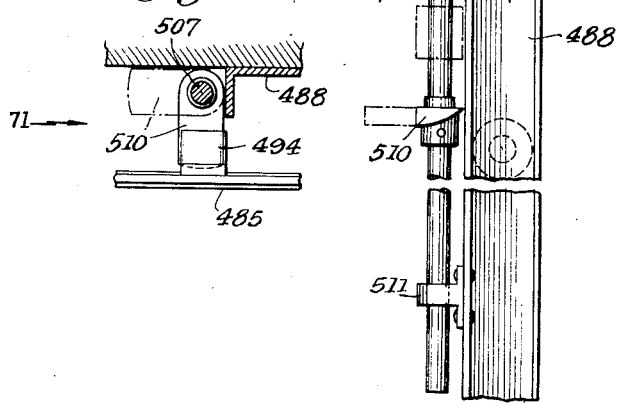
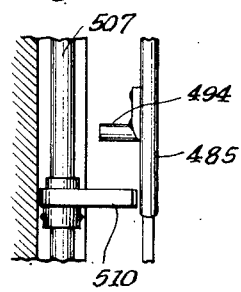

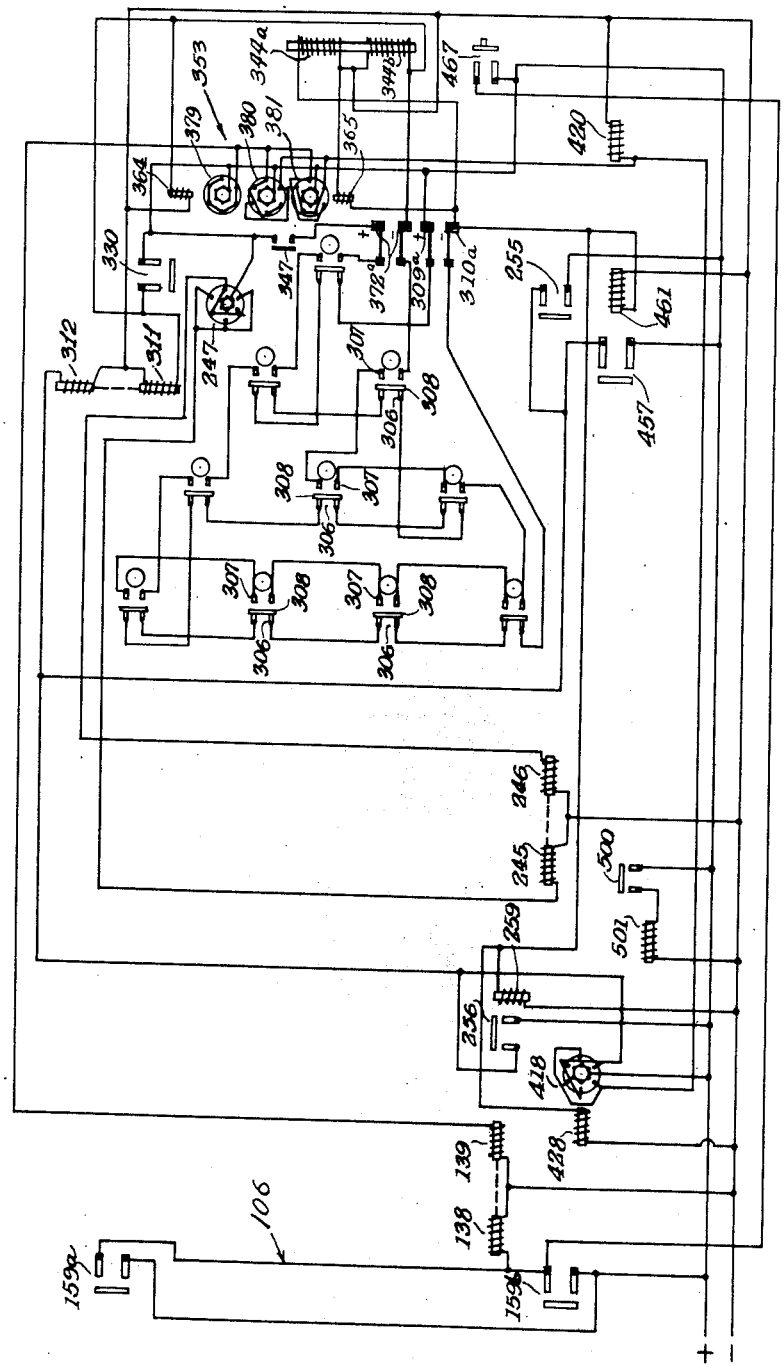

Dec. 21, 1954

G. A. MONTOOTH ET AL 2,697,605

MACHINE FOR SETTING PINS ON BOWLING ALLEYS

Filed March 26, 1946

INVENTORS
GEORGE A. MONTOOTH
ALBERT M. BOWEN
BY
C. G. Stratton
ATTORNEY

United States Patent Office 2,697,605
Patented Dec. 21, 1954

2,697,605

MACHINE FOR SETTING PINS ON BOWLING ALLEYS

George A. Montooth and Albert M. Bowen, Long Beach, Calif., assignors to The Brunswick-Balke-Collender Company, Chicago, Ill., a corporation of Delaware Application March 26, 1946, Serial No. 657,238

4 Claims. (Cl. 273—43)

This invention relates to machines for setting pins on bowling alleys and deals more particularly with a completely automatic, synchronized and coordinated mechanism for performing all of the various functions attending the different conditions encountered in a game of bowling.

An object of the invention is to provide a pin setting and ball returning machine which is normally conditioned to a two-ball or spare cycle of operation and which automatically shifts or conditions itself to a one-ball strike cycle or two-ball gutter ball cycle of operation according to the number and position of pins remaining standing after a ball has been rolled.

A further object of the invention is to provide novel and improved switching means automatically shifting the mechanism from a spare cycle of operation to a strike cycle or a gutter ball cycle as determined by the number of pins felled and left standing on the alley deck after a ball is rolled.

A still further object of the invention is to provide a novel pin setting rack device embodying a number of similar units, one for each pin of a set of pins, and which is electrically controlled to function in various ways according to the number of units that are engaged by standing pins.

Our invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawings merely show and the following description merely describes one embodiment of the present invention, which is given by way of illustration or example only.

In the drawings, like reference characters designate similar parts in the several views.

Figure 1:
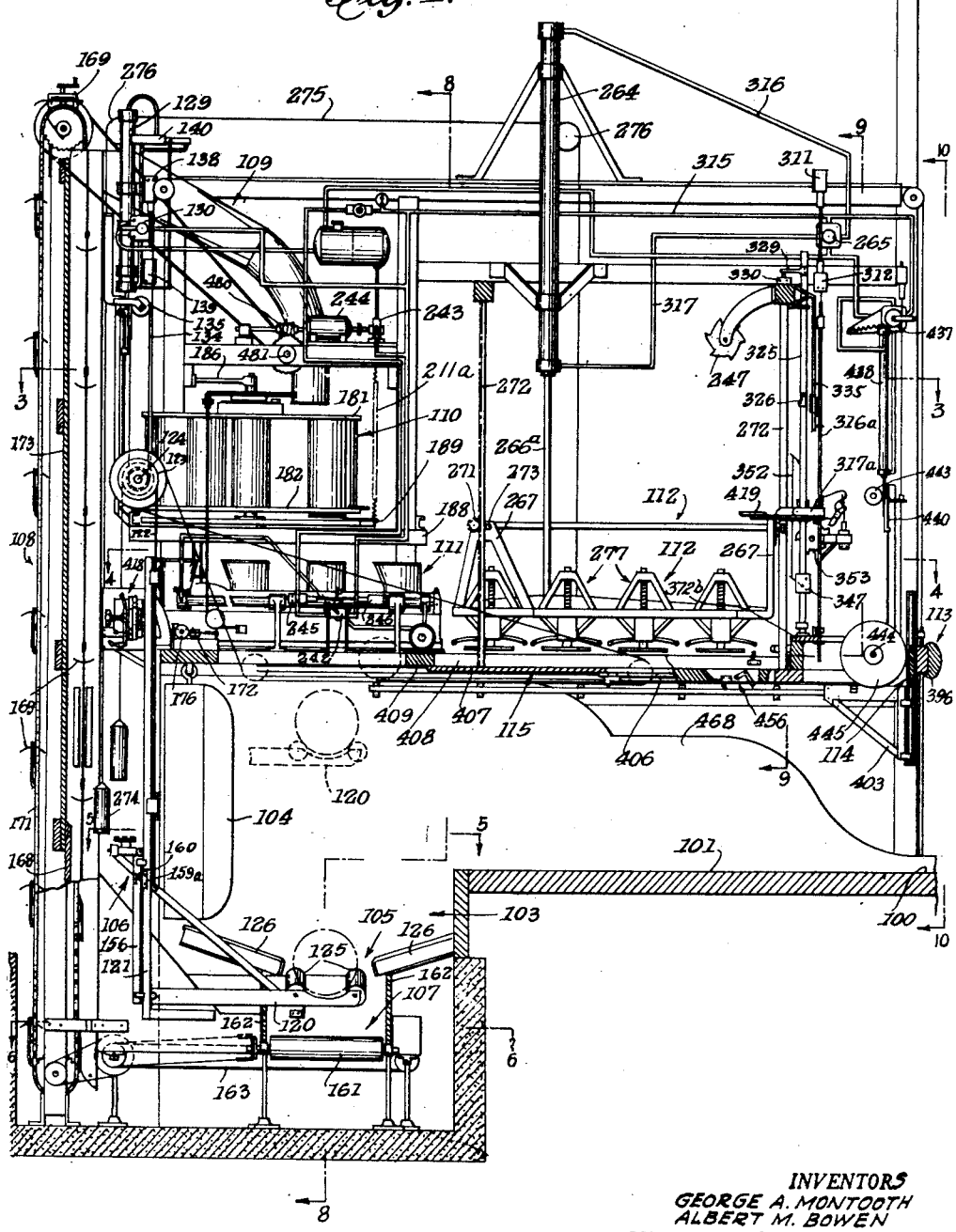
Fig. 1 is a vertical sectional view of a pin setting mechanism according to the present invention.

Figs. 3, 4, 5 and 6 are plan sectional views as taken on lines 3—3, 4—4, 5—5 and 6—6, respectively, of Fig. 1.

Fig. 7 is an enlarged fragmentary sectional view as taken on line 7—7 of Fig. 6.

Figure 8:
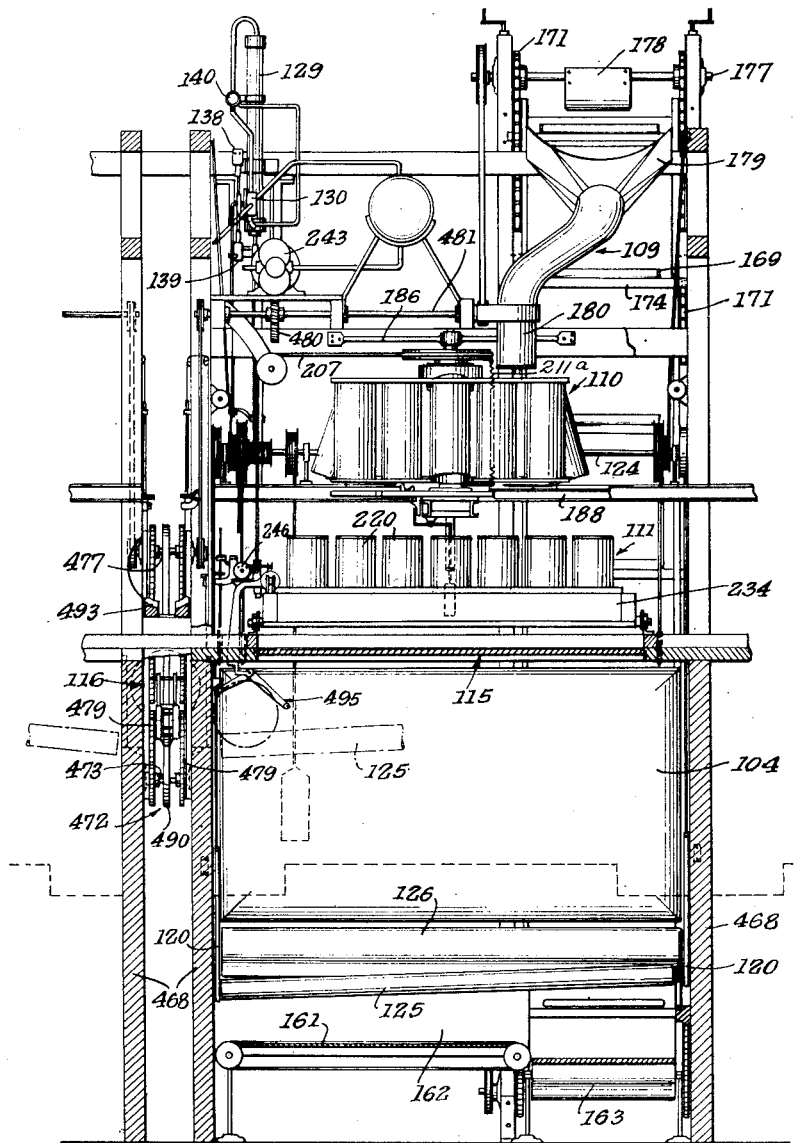

Figs. 8 and 9 are enlarged vertical transverse sectional views as taken on lines 8—8 and 9—9, respectively, of Fig. 1.

Fig. 10 is an enlarged broken front elevational view as seen in the direction of arrows 10—10 of Fig. 1.

Fig. 11 is a broken perspective detail view of a portion of the mechanism shown in Fig. 10.

Fig. 12 is a broken perspective view of means for conveying pins in and from the pit to a top point of the machine.

Fig. 13 is a similar view, with details omitted, of the pin magazine and pin rack in associated relation.

Fig. 14 is an enlarged vertical sectional view of the machne components shown in Fig. 13.

Fig. 15 is a plan sectional view as taken on line 15—15 of Fig. 14,

Fig. 16 is a greatly enlarged fragmentary sectional view of parts shown in the upper portion of Fig. 14.

Fig. 17 is a fragmentary side view, partly in section, of a tiltable pin handling tube in the magazine shown in Fig. 14.

Fig. 18 is a similar front view thereof.

Fig. 19 is a broken plan sectional view as taken on line 19—19 of Fig. 17.

Fig. 20 is an enlarged fragmentary plan view of latching means employed in the magazine.

Fig. 21 is a fragmentary sectional and detailed side view thereof.

Fig. 22 is a fragmentary front view of a portion of the means shown in Fig. 21.

Fig. 23 is a broken plan view of mechanism for controlling the movement of the pin tray.

Fig. 24 is a side view thereof.

Fig. 25 is a broken perspective view showing pin lifting, pin deck covering and guard means employed in the invention in their interconnected relation.

Fig. 26 is a fragmentary view of a switch for initiating the operation of the machine.

Fig. 27 is a longitudinal sectional view of spring means normally holding said switch open.

Fig. 28 is a broken longitudinal sectional view, partly in elevation, of a roller embodied in the ball lifting mechanism.

Fig. 29 is a semi-diagrammatic view showing mechanism controlling a drive shaft of the machine and embodying action delaying means.

Fig. 30 is a detailed vertical sectional view of one of ten similar pin engaging units of a pin setting rack used in the invention.

Fig. 31 is a sectional view thereof as seen at right angles to Fig. 30.

Fig. 32 is a broken plan view thereof.

Fig. 33 is a fragmentary view thereof, as seen in the direction of arrows 33—33 of Fig. 31.

Fig. 34 is a further broken view of parts shown in Fig. 33 in another position.

Fig. 35 shows a group of four vertical sectional views of a latch used in the invention and in various positions thereof.

Fig. 36 is a side view as viewed in the direction of arrows 36—36 of Fig. 9 of means for controlling a control bar affecting the movement of the pin setting rack.

Fig. 37 is a side view as seen in the direction of arrows 37—37 of Fig. 9 of a switch controlled by the movement of said rack.

Fig. 38 is a vertical sectional view as taken on line 38—38 of Fig. 37.

Fig. 39 is a face view of a contact mounted disc of said switch.

Fig. 40 is a fragmentary sectional view on the line 40—40 of Fig. 39.

Figs. 41 and 42 are side views of respective upper and lower portions of a switch and connections for preventing shifting of the machine into its gutter ball cycle except at the proper time, said views being taken on respective lines 41—41 and 42—42 of Fig. 9.

Figs. 43 and 44 are side views of respective intermediate and lower portions of the rack control bar as seen in the direction of the respective arrows 43—43 and 44—44 of Fig. 9.

Fig. 45 is a sectional view as taken on line 45—45 of Fig. 43.

Fig. 46 is a front view as seen from the right of Fig. 43.

Fig. 47 is a similar view as seen from the right of Fig. 44.

Fig. 48 is a broken side view of the upper rack controlling means as seen in the direction of arrows 48—48 of Fig. 9.

Fig. 49 is a front view thereof.

Fig. 50 is a side view of the intermediate rack controlling means as seen in the direction of arrows 50—50 of Fig. 9.

Fig. 51 is a front view thereof.

Fig. 52 is a broken side view of a switch which effects shifting of the machine from a two-ball or spare cycle of operation to a strike or gutter ball cycle of operation.

Fig. 53 is a longitudinal sectional view thereof.

Fig. 54 is a side view of switch means for controlling movement of the pin setting rack in synchrony with the movement of the pin tray.

Fig. 55 is a diagrammatic view showing the contact arrangement of the switch shown in Figs. 52 and 53.

Fig. 56 is a fragmentary side and sectional view of a switch mechanism operated by the movement of the squeegee.

Fig. 57 is a top plan view thereof.

Fig. 58 is a side view, partly in section, of a switch for alternately controlling the movements of the pin setting rack and the squeegee.

Fig. 59 is a front view thereof.

Fig. 60 is a diagrammatic view showing the arrangement of the contacts of said switch.

Fig. 61 is a side view of a switch mechanism for initiating movement of the pin setting tray during a strike cycle.

Fig. 62 is a side view of means controlling operation of the squeegee.

Fig. 63 is a broken side view of means for delivering a ball to the return track of the alley.

Fig. 64 is a vertical sectional view thereof on the line 64—64 of Fig. 63.

Fig. 65 is a plan sectional view on the line 65—65 of Fig. 63.

Fig. 66 is a vertical side and sectional view as taken on line 66—66 of Fig. 64.

Fig. 67 is an enlarged plan view of mechanism shown in Fig. 63.

Fig. 68 is a broken side view thereof.

Fig. 69 is a fragmentary sectional view as taken on line 69—69 of Fig. 68.

Fig. 70 is an enlarged cross sectional view on line 70—70 of Fig. 68.

Fig. 71 is a broken detail view as seen in the direction of arrow 71 of Fig. 70.

Fig. 72 is a wire circuit diagram of the electrical elements of the machine.

Figs. 73, 74 and 75 are schematic views showing the sequence of operation of the machine components during a spare cycle, a strike cycle and a gutter ball cycle, respectively.

The embodiment of the machine which is illustrated in the drawings may be said to comprise the following components and the means for synchronously operating said components to effect proper handling of the pins and the ball under the varying conditions attending a strike, a gutter ball, or a spare, the last including a two-ball miss.

The alley 100, its pin-spotting deck 101 and its gutters 102 are conventional, the alley terminating in a pit 103 provided with a back stop 104 for receiving the impact of the ball and any pins which may be propelled against it. According to the invention, the pit 103 is provided with means 105 for lifting a ball from a low point in the pit to an elevated point from which it is discharged for return or delivery to the bowler, with starting switch means 106 initiating the synchronous movement of various portions of the mechanism, and means 107 for moving pins in the pit for elevation therefrom by a pin lift conveyor 108. The latter serves to move the pins to an elevated point of the mechanism for discharge into a chute 109. A pin magazine 110 receives the pins from the chute 109 and, when filled with a full complement of ten pins, discharges them into a pin spotting tray 111 therebeneath. Said tray is movable to a position over the deck 101 for extraction of the pins therefrom by a pin setting rack 112. The rack not only serves to receive a full complement of pins from the tray 111 and deposit them in proper spotted position on the deck 101 but also serves to engage and lift any pins left standing after a ball has been rolled so that said deck can be swept clear of fallen pins. The rack re-deposits such pins in the same positions from which they have been lifted subsequent to clearing of the deck so that they are ready for the second ball to be rolled.

The mechanism further includes a guard 113 which has a normal elevated position and is moved to a position across the alley in front of the deck during the period of operation of the mechanism to protect the same against injury by a prematurely rolled ball. A squeegee or deck clearing device 114 moves vertically with the guard and also moves rearwardly to sweep the deck of fallen pins after the pin setting rack has lifted standing pins. There is also provided a pin deck cover 115 suitably elevated with respect to the deck 101 to give ample pin clearance. Said cover 115 is normally closed to protect the rack 112 and other mechanism from injury by flying pins but opens synchronously with the downward movement of the guard 113 so that the rack 112 may move vertically through the resulting opening.

The mechanism also provides means 116 for receiving a ball from the lift 105 for return thereof to the bowler. The particular means 116 shown contemplates mechanism which serves adjacent alleys.

Ball lift 105

The ball lift 105 shown best in Figs. 1, 5, 8, 12 and 25 comprises a pair of side brackets 120 mounted for vertical movement on tracks 121 by means of belts 122 trained on pulleys 123 mounted on shaft 124. The brackets 120 support a pair of spaced rollers 125 which are arranged transversely in the pit and at a slight angle from side to side as shown in Fig. 8. A ball leaving the deck 101 will strike back stop 104 and will fall on either of the sloping walls 126 to be guided thereby to fall on said rollers. Pins falling into the pit will be similarly guided. However, the spacing of the rollers 125 is such that they will support a ball but allow pins to fall between them. Since some of the pins may assume a transverse position across the rollers, one or both may be caused to rotate as they are elevated from the position shown in Figs. 1 and 8 to the position shown in Fig. 64 to dislodge such transverse pins and induce them to fall between the rollers. As the rollers are raised, the ball naturally rolls to the low side from where it is received by the ball delivery mechanism 116.

Rotation of one of the rollers 125 is simply effected as seen in Fig. 28 by providing a torsional spring 126 in either roller, in the manner of a shade roller, training a number of turns of rope or cable 127 about the roller, and anchoring said rope or cable as at 128 to a fixed point of the pit. Raising the roller will cause the rope to unwind to rotate the roller in one direction and store energy in the spring 126. Lowering the roller will cause said spring to rotate the roller in the opposite direction and to rewind the rope. Such reversal of rotation insures dislodgement of a transversely disposed pin.

The means which rotates the shaft 124 is best seen in Fig. 29. Said means includes a fluid cylinder 129 controlled by a four-way valve 130 to move a piston rod 131. The latter, in turn, is connected to a traveling carriage 132 guided by a track 133 and connected to a belt 134 trained about upper and lower pulleys 135 and 136, respectively. The latter pulley is mounted on the shaft 124.

The valve 130 is controlled, through a gear and rack 137, by solenoids 138 and 139, the former being in circuit with the starting switch mechanism 106. A hydraulic cylinder 140 is connected by a line 141 to the pressure side of the valve 130 and by a line 142 to the fluid cylinder 129. A check valve 143 is placed in the cylinder 140 between the points of connection of the lines 141 and 142. The cylinder 140 is provided to prevent a premature elevation of the rollers 125 since, as will be later described, the means 106 is operated upon impact of a ball to start elevation of the ball lift.

Accordingly, a by-pass bleeder 144 is provided between the line 141 and the cylinder 140 and a piston 145 having a stem 146 is arranged in said cylinder. The stem 146 unseats the check valve 143 within a short time interval after operation of the means 106 and consequent opening of the valve 130 to fluid pressure. At first, the line 141 will be closed by check valve 143. However, as the stem 146 is raised by fluid pressure from the bleeder 144, said check valve will be opened to admit fluid pressure to cylinder 129 and cause downward movement of carriage 132. Fluid returns to the valve 130 from the cylinder 129 by a line 147 and returns from cylinder 140 by a bleeder line 148.

Means are provided to close the valve 130 when desired elevation of the rollers 125 is attained. Said means is shown as comprising an arm 149 fixed with the gear 137, a rod 150 carried by said arm, an adjustable stop collar 151 on the rod, and a bracket 152 carried by the carriage 132 and arranged to engage said stop collar. The solenoid 138 will raise the arm 149 as the line 141 is opened to pressure and the bracket 152 will depress said arm to close valve 130 upon desired elevation of the rollers 125.

Means, later described in connection with switch 353, are provided for energizing solenoid 139 to cause return of the carriage 132 and depression of the rollers 125. Since this action may occur rapidly, the cylinder 140 is by-passed, and the line 147 is utilized to carry pressure fluid from the valve 130 to the cylinder 129 to raise the piston rod 131 and the carriage 132. An adjustable collar 153 on the rod 150 is engaged by the rising bracket 152 to restore the valve 130 to closed position upon desired depression of the rollers 125.

Starting switch mechanism 106

This component of the machine includes the brackets 120 which in their lower position rest on stops 155 carried at the lower ends of the tracks 121. The brackets 120 are designed as bellcrank levers each having a horizontal arm carrying the rollers 125 and a vertical arm 156 spaced from the track and mounting a roll 157 engaging the track 121 and provided with a spring 158 reactively pressing the arm 156 outward and the rollers 125 upward (Figs. 25 and 26). The brackets 120 pivot about the rollers 155a which engage the tracks 121.

When a ball strikes the rollers 125, they will be depressed causing pivotal movement of the brackets 120 and compression of the springs 158. By placing microswitches 159a and 159b, respectively on each track 121 and an actuator angle strip 160 on each arm 156, depression of said rollers 125 will cause closing of one or both of the switches 159a and 159b to energize the mentioned solenoid 138 and institute lifting of the rollers 125 away from stops 155. It will be evident that the ball may strike the rollers 125 and gyrate about before settling into position. A premature raising of the rollers may cause the ball to be left behind in the pit. It is for this reason that the delayed action of the ball lift, as caused by the cylinder 140, is employed.

Mechanism 107 for moving the pins in the pit

Figs. 1, 5, 6, 7, 8 and 12 best show this component. Beneath the rollers 125 there is provided a belt conveyor 161 arranged transversely between walls 162 to move pins falling thereon from one side of the pit toward a second belt conveyor 163 which operates to move the pins toward the rear of the pit. The conveyors have a generally L-shaped arrangement to receive the pins and move them toward the lift conveyor 108 which is placed at one side of the pit as seen in Figs. 6 and 8. The conveyors operate continuously during the operation of the machine. The wall 162 nearer the deck 101 extends completely across the pit and the other terminates at the conveyor 163 which is provided with pin retaining walls 164 extending to the conveyor 108.

As shown in Fig. 7, a hopper 165 is provided to receive the pins as they are dropped by the conveyor 163. The hopper comprises a pair of associated pivoted member 166 which are tilted toward each other to form a support upon which a pin may rest, said pin being retained laterally by a fixed wall 167 at the end of the conveyor 163 and the bottom part of a back wall 168 forming an element of the pin lift conveyor 108. It will be evident that a pin is properly cradled on the members 166 and between walls 167 and 168 out of rubbing contact with the conveyor 163.

The shelves 169 of said conveyor 108 are designed to move upwardly between the members 166 and to spread them so that the pin may fall to be picked up by an upwardly moving shelf. The members 166, as a shelf goes by, return to their tilted position ready to receive another pin.

The walls 167 and 168 are so spaced and positioned with respect to the members 166 as to hold the butt of a pin at a position above the level of the members 166 and slightly off center with respect thereto. This will cause a swinging of the head of the pin which is smaller than the butt, so that it will come to rest over the center of the hopper and, therefore, of the shelf 169. Since the pin cannot lie snugly in the hollow of the shelf but is held outward by the wall 168, should the head not be centered on the shelf, the pin will be over-balanced and will fall back onto the conveyor 163 to be picked up by a following shelf. Only one pin can be accommodated on each shelf.

Pin lift conveyor

Figs. 1, 2, 3, 6, 7 and 12 best show this component of the machine. The conveyor comprises the mentioned vertical back wall 168 arranged between upper extensions 170 of the walls 164, a pair of sprocket chains 171 disposed on the outer sides of said extensions, sprockets 172 about which the chains are trained, and the mentioned shelves 169 carried in spaced relation by said chains so that they move continuously during the operation of the machine. The wall 168 is provided with an upper somewhat set back extension 173 so that if a pin remains on a shelf until the set back wall is reached, it will then have room to center itself on the shelf for transfer to the upper end of the pin lift.

Bars 174 connect the chains and their ends move in slots 176 formed in the walls 170. Each bar 174 has a shelf 169. Means are provided for centering a pin on its shelf and simply comprise spring fingers 175 on each wall 170 designed to slide a pin to a central position on its shelf.

The conveyor moves so that the shelves travel upwardly at the front of the walls 168 and 173. The upper sprockets 172 are mounted on a shaft 177 on which is fixed a paddle 178. The rotation of the paddle is arranged to synchronize with the movement of the shelves to cause said paddle to dislodge a pin as a shelf bearing it moves by. Inasmuch as the paddle will engage the thick part or butt of the pin, the latter will be pushed off its shelf butt first to fall into the pin chute 109.

Pin chute 109

The pin chute is best shown in Figs. 1, 2, 12 and 13 and comprises a fixed sheet metal member having a wide pin receiving part 179 which is gradually reduced or tapered to terminate in a tubular portion 180 leading to the pin magazine 110. The chute walls are so sloped and arranged to properly guide a pin, butt first, as it falls from its elevating shelf 169, to the magazine 110.

Pin magazine 110

The pin magazine is illustrated in Figs. 1, 3, 8 and 13 to 22 inclusive. The magazine comprises a frame formed of a top circular disc 181 and a somewhat similar bottom disc 182 connected by a spacing tube 183. This frame, by means of anti-friction bearings 184, is mounted for rotation on an axial vertical shaft 185 fixedly supported between a bracket 186 on the framing of the machine and a semi-circular domed bracket 187 mounted on a horizontal frame 188 carried by the framing of the machine. A third circular disc 189 is disposed between the disc 182 and frame 188 and is mounted for rotation on shaft 185 by anti-friction bearings 190. The upper of said bearings is carried by a sleeve 191 extending through the lower of the bearings 184.

In circular arrangement between the discs 181 and 182 there are provided ten tubes of a size to receive and accommodate a bowling pin. Six of these tubes 192 have a respective arrangement corresponding to the two, three, four, six, eight and nine spots of a set of pins on an alley deck. These tubes are fixed between discs 181 and 182. The other four tubes 193, 194, 195 and 196 are each arranged to swing on a pivot 197 in the disc 181 so that they can be directed toward the one, seven, ten and five spots, respectively. Registering openings are provided in the discs 181 and 182, so that pins from the chute 109 may fall successively into the tubes 192 to 196, inclusive, and come to rest upon disc 189. Accordingly, there is provided means for intermittently rotating the magazine frame as a pin enters a tube.

The power for rotating the magazine is provided by a clock spring 198 having its outer convolution secured to a spring case 199 rigidly secured to disc 181 and its inner convolution to a spring winding disc 200 rotatable on the shaft 185. The winding disc carries a dog 201 associated with a ratchet 202 fixed on the shaft 185.

Above the ratchet, a winding pulley 203 is mounted for rotation on said shaft and a smaller clock spring 204 has its outer convolution fixed to the pulley and the inner convolution fixed to the shaft. The underside of the winding pulley 203, not shown in Fig. 16, carries a dog 205 associated with a stop 206 on the winding disc 200.

As the winding pulley is rotated by movement of a cable 207, the dog 205 engages stop 206 to drive the winding disc 200 and store energy in the spring 198. At the end of the winding movement of disc 200, its dog 201 will engage a notch in ratchet 202 to hold the spring 198 from unwinding as the pulley 203 rotates reversely under power of spring 204. Upon release of the pin magazine by a pin dropping thereinto, the spring 198 will cause the magazine to rotate until stopped.

The magazine is held latched by a catch indicated generally at 208 which is carried by frame 188 and embodies a trip paddle 209 located to be depressed by a pin as it falls into one of tubes 192 to 196, inclusive, which is in register therewith. The paddle is carried by a catch bar 210 pivoted at 211 (Fig. 3) to allow the paddle to be depressed and the paddle is yieldingly held in an upper position by spring 211a (Fig. 14). Upon depression of the paddle, the entire catch bar 210 is depressed to cause a block 212 on the catch bar to be moved out of engagement with a stop lug 213a on disc 182. One of these stop lugs 213a is associated with each pin tube. Upon release of the catch bar by a falling pin, the spring 198 becomes effective to rotate the pin magazine so that the next succeeding tube is registered with the paddle 209. The catch 208 has a finger 212a pivoted thereon and urged counter-clockwise to a position behind the lug 213a by a spring 212b in order to prevent inadvertent reverse movement of the magazine. A lug 212d on the catch bar is spaced from the block 212 and of a lesser height than the block 212 so that a lug 213a may freely pass thereover when the magazine rotates. The lug 212d limits counter-clockwise movement of the finger 212a. The block 212 is yieldingly held in position by the spring 212c which is sufficiently strong to prevent unintentional movement of the block 212 but yields when the lug 213a hits the block 212.

The catch 208 functions to permit movement of the magazine step-by-step in order to receive pins one-by-one from the chute 109. Each time that a pin enters into one of the tubes 192—196, the paddle 209 is momentarily depressed by the pin to lower the parts 212—212d and thus free the magazine for rotation by the spring 198 until the next lug 213a engages with the block 212 which has been raised to blocking position by the spring 211a. The last referred to lug 213a prior to engagement with the block 212 will engage the finger 212a and cause it to pivot in a clockwise direction against the action of spring 212b. As the lug 213a moves beyond the finger 212a, the finger will snap in behind the lug 213a.

The disc 189 is provided with openings 213 which are normally out of register with the tubes 192 to 196 so that pins in said tubes are supported by said disc 189. The discs 182 and 189 are normally latched to move together as pins are dropped into the pin tubes. This latching means, which is best seen in Figs. 20 and 21, comprises a latch lever 214 carried by a bracket 215 on the upper side of disc 189 and block 216 on the under side of the disc 182. A spring 217 normally holds the latch lever engaged with the block so that rotation of the pin magazine is imparted to the disc 189. The latch lever is further provided with a downreaching finger 218 which is in the path of movement of a trip member 219 which is located to engage the finger when the last or tenth pin is dropped into the magazine. The member 219 through engagement with finger 218 holds the disc 189 until said member is withdrawn. The disc 189 will thus be held from further rotation while the spring 198 is effective to continue rotation of the magazine, and the fixed tubes 192 are aligned with the openings 213 so that pins in said tubes can fall through said openings into aligned pin-receiving cans 220 carried by the pin spotting tray 111.

The above-described relative motion of the magazine and disc 189 also causes tilting of tubes 193 to 196, inclusive. As seen in Figs. 17 and 18, each of said tubes, except tube 196, is provided with an arm 221 near its top end. A link 222 is connected between said arm and a pair of toggle links 223, one of which is connected to a bracket 224 on disc 182 and the other to a bracket 225 on disc 189 which extends through a suitable arcuate slot 226 in disc 182. The relative movement of the discs 182 and 189 causes the bracket 224 to move away from the bracket 225, resulting in a spreading of the toggle links 223, a downward pull on link 222 and a consequent tilting of the pin tubes on their pivots 197. A simple link connection 227 between tubes 193 and 196 is provided and the tiltable tubes are so arranged as to direct pins into cans in the pin tray which correspond to the one, five, seven and ten spots of a set of bowling pins in position.

When the disc 189 is stopped by trip 219 and the disc 182 continues to rotate to effect dropping of the pins into the spotting tray 111, the "five" pin, i. e., the pin which was held in tube 196, falls through an opening 228 in disc 189. A trip lever 229 in the can 230 receiving said "five" pin, is depressed to raise pin 231, rock lever 232 and depress link 233 connected with trip 219. Depressing link 233 withdraws the trip from engagement with latch lever 214 allowing disc 189 to continue its rotation, this time together with disc 182, until the next succeeding stop lug 213a is engaged by catch 208 to stop disc 182. Because of its momentum as imparted particularly by the inertia of the tilted tubes, disc 182 continues to rotate until latch lever 214 is again caught by block 216. The tubular portion 180 of the chute is positioned to be over a blank portion of the magazine when the latter is discharging its pins. Any pin discharged into the chute will therefore come to rest on the top of plate 181 to be held until the magazine returns to its reloading position. The pin will then fall into one of the tubes as before described and the magazine will receive pins in successive tubes.

*Pin spotting tray 111*

Figs. 1, 4, 8, 13 and 14 show this component of the machine which is normally located directly beneath the magazine for receiving pins therefrom. Said tray is movable to a position above the deck 101 so that pins in said tray may be upwardly extracted by the pin setting rack 112 for subsequent placing of the pins on their proper spots on deck 101.

The tray comprises a frame 234 mounted on wheels 235 to travel on tracks 236 between its pin receiving position and its pin extracting position. The frame 234 mounts the mentioned cans 220 for receiving pins from the unpivoted tubes 192 of the magazine, the mentioned can 230 for receiving a pin from tube 196 and cans 237, 238 and 239 for receiving pins from pivoted tubes 193, 194 and 195, respectively. Inasmuch as the pins falling into cans 230, 237, 238 and 239 are directed at an angle, each of said cans is formed with a chute-like portion 240 for suitably guiding pins falling into them. Ten cans comprise a full complement and their relative position accord with the spot positions of pins on an alley deck.

The "five" pin falling from tube 196 into can 230 is arranged to have a slightly greater distance to fall than the remaining nine pins and it is for this reason that the mentioned trip lever 229 is arranged, in association with can 230, to actuate the trip 219.

Figure 2:
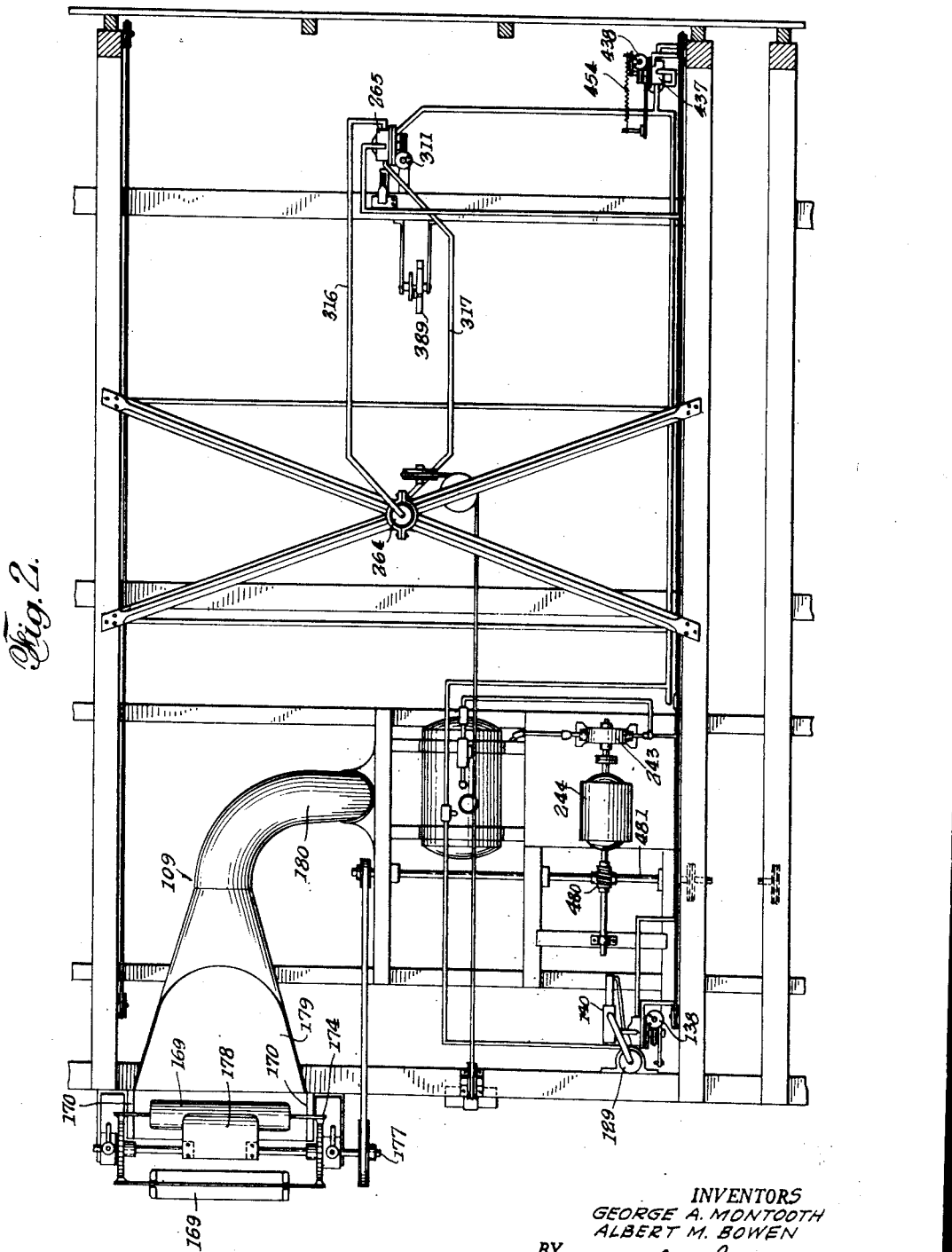
Fig. 2 is a somewhat enlarged top plan view thereof.

The means provided for moving the tray along its tracks is shown best in Figs. 4, 23 and 24. Said means comprises a hydraulic or other fluid cylinder 241 arranged for two-way operation, under control of a four-way valve 242, by fluid pressure supplied by a pump 243 driven by a motor 244 (Figs. 1 and 2). The valve 242 is operated by solenoids 245 and 246. The latter is controlled by switch 247 (Figs. 1 and 72) to shift valve 242 to cause pressure in cylinder 241 to actuate piston 248 and cause the tray to move from its loading to its pin extracting position.

A lever arm 249 on the valve 242 is associated with a control rod 250 having a stop collar 251 and carried by the tray frame 234. At the end of the mentioned movement of the tray, said collar 251 will engage lever arm 249 to move it and thus close valve 242. After the pins are extracted from the tray by the pin setting rack 112, the switch 247 closes the circuit to solenoid 245 shifting the valve 242 to cause fluid pressure in cylinder 241 to retract the tray. At the end of its latter movement, a stop collar 252, on control rod 250, acts to close valve 242.

Figs. 24 and 54 show a trigger 253 mounted on the tray frame 234 to engage the switch lever 254 of a switch 255 mounted in a stationary position near the forward end of one of the tracks 236. When the tray moves into its pin delivering position, the trigger 253 engages switch lever 254 to close switch 255 which is normally open and control the operation of the pin setting rack 112 in synchrony with the forward delivery movement of the tray. The tray can overrun the switch lever 254 since, upon return movement of the tray, the trigger 253 can tilt past the now open or raised switch lever 254.

When the tray returns to its reloading position, it is unnecessary to make any contacts to restart the cycle of operation for a spare or a gutter ball cycle until the second ball has been rolled. However, in the strike cycle there is no second ball and when the tray returns to its reloading position it actuates means for initiating the pin setting movement of the pin spotting rack 112. As shown in Figure 61, said means comprises a switch 256, a trigger 257 on the tray frame 234, a system of levers 258 mounting the switch, a solenoid 259 controlling the levers, and a latch 260 for said levers. As the tray moves into refilling position, trigger 257 strikes the operating button 261 of switch 256 closing the switch. Continued movement of the tray unlatches the lever system 258 from latch 260 and the lever system either falls by gravity or is pulled by a spring 262 to bring the switch 256 out of engagement with trigger 257. The mentioned closing of switch 256 will initiate the pin setting movement of the pin spotting rack. The unlatching of the lever system to retract the switch 256 out of the path of movement of the tray will allow the tray to return to reloading position without interference. Said retracted position is retained until the solenoid 259 is energized to restore the switch to a position in the path of movement of the trigger 257.

The mentioned cable 207 for winding the spring 198 is trained over suitable pulleys 263 and connected to the tray frame 234 so that said spring 198 is wound each time the tray moves forward as above described.

Pin spotting rack 112

This device is illustrated best in Figs. 1, 3, 4, 9 and 30 to 34 inclusive. As seen in Fig. 1, the rack is carried, raised and lowered by a pressure fluid cylinder 264 which receives fluid under pressure for two-way up and down motion of the rack, from the pump 243. Figs. 1 and 36 show a four-way valve 265 for controlling the operation of the piston rod 266a of the cylinder and, because of the latter's connection with the rack, the raising and lowering of said rack.

The rack comprises a relatively large frame 266 of generally triangular shape. Because of its size said frame is apt to be distorted by pressure forces as applied by the cylinder 264. Accordingly, means are provided for maintaining all portions of the frame, and the three corners thereof, level at all times. Said means comprises upstanding brackets 267 fixed on the frame at the corners thereof, a transverse shaft 268, and a longitudinal shaft 269 connected to shaft 268 by bevel gearing 270. Pinion gears 271 on the outer ends of shafts 268 and 269 are arranged to mesh with vertical gear racks 272 carried fixedly by the framing of the machine. Except for negligible torsion of the shafts 268 and 269, the engagement of the gears with their respective racks will maintain the rack frame 266 level at all times. The frame also carries rollers 273 which engage the smooth sides of the racks to further stabilize the structure. The weight of the rack is counter-balanced by a counterweight 274 which is connected by a cable 275, trained over pulleys 276, to a mid point of the rack frame 266.

The frame 266 is provided with ten similar pin grasping and lifting units 277 arranged in the same pattern as are the cans of the pin tray 111 and according with the spotted positions of pins on an alley deck. One of said units is more fully detailed in Figs. 30 to 34 inclusive.

Each unit 277 comprises inter-dependent mechanisms consisting of a vertically movable mechanism 278 and a horizontally movable pin lifting and holding carriage 279.

The mechanism 278 includes a horizontal plate 280 provided on its underface with a compressible pad 281 and carried by a stem 282 slidably mounted in guide bearings 283. The bearings are provided in a preferably cast rigid yoke 284 secured to frame members 285 carried by transverse frame members 286 of the frame 266. A spring 287, about stem 282, has abutment at one end against the upper of bearings 283 and engagement, at its other end, against an abutment collar 288. A latch 289, which is shown in greater detail in Fig 35, is arranged within a sleeve 290 carried by stem 282.

As the rack 112 moves downwardly, either toward pins on deck 101 or pins in the tray 111 therebeneath, any of the plates 280 which come into contact with the tops of pins will be pressed upwardly. As the rack continues to move down, the stem 282 will slide in its bearings and collar 288 will compress spring 287 until the plate 280 is arrested against further movement by the lower of bearings 283. As the rack moves upwardly the spring 287 will hold plate 280 against the pin until the latch lug 291 is engaged by upwardly moving bearing 283 to tilt the latch to the A position of Fig. 35 and stop any further relative movement of the rack and the plate 280. This position is maintained while the rack is holding pins.

The various positions of latch 289 are attained through the medium of a pivot 302 slidable in a slot 303 in sleeve 290, and an over-center spring 304a by means of which the latch is held in tilted position in either latching or non-latching position.

The latch 289, as shown in Fig. 35, has four different positions; namely, A position, B position, C position, and D position. The latch, as shown in C position, is positioned to engage bearing 283 after said bearing moves downwardly relative to the latch and, by engagement with latch lug 291, causes a slight pivoting of the latch to the D position. After the bearing 283 passes by lug 291, the latch returns to the C position.

When the bearing is beneath the latch and moves upwardly relative to latch 289, it engages lug 291 and moves the latch to the A position. When this occurs, the pivot 302 is shifted in slot 303 and throws the action of the over-center spring 304a to the other side of the pivot. Upon subsequent relative downward movement of bearing 283, the latch, under the urging of spring 304a, pivots to the B position. As the bearing then moves relatively upward past the latch, it engages throw lug 289a on the latch and shifts the pivot 302 to the D position with resultant shifting of the action of spring 304a. When the bearing moves completely by the latch, it then falls into the C position under the urging of spring 304a.

The pin lifting and holding carriages 279, each comprise a pair of padded parallel horizontal bars 292 each mounted between a pair of levers 293 pivoted at 294 on carriage frames 295. Each carriage is provided with rollers 296 engaged with one of a pair of bar tracks 297 on the frame 266 whereby the carriage is mounted for movement along said bar tracks. A push bar 298 connected by links 299 to levers 293, is mounted on each carriage 295 for vertical movement. A sliding connection is made between each push bar and the plate 280 by providing a track 300 on said plate to engage a roller 301 on the lower end of each push bar. In this manner the push bar is connected with the plate 280 in various lateral positions of the carriage with respect to the plate.

It will be obvious that the mentioned relative movement of the plate 280 and rack frame 266 will cause the push bars 298 to move, the links 299 to swing the levers 293 toward each other, and the bars 292 to engage and grasp the neck of a pin between them. Since the latch 289 maintains the mechanism in the pin holding position, upon upward movement of the rack, the grasped pins will be carried upward. When the rack subsequently moves downwardly toward the deck 101 and any pins carried thereby come to rest upon said deck, the plates 280 are pressed relatively upward to permit latch 289 to tilt from its A position, to its B position of Fig. 35 under the urging of spring 304a and cause release of the lower bearing 283 from the latch lug 291. Upon subsequent upward movement of the rack, the springs 287 become effective to hold the plates 280 against the ends of the pins as the frame 266 moves up causing levers 293 to open. Continued upward movement of the rack will clear the bars 292 from the pins and leave the latter in position on the alley deck. As the rack moves up, the latch 289, by means of the lower of bearings 283, is moved from the B position, through the D position to fall into the C position of Fig. 35. The latch is again ready to catch the next time that the plate 280 is pressed by a pin.

Normally, the pins are received by each pin unit 277 so they are aligned substantially centrally or axially with the stem 282 and the rack will deliver said pins to the proper spots or places on the pin deck. However, after a ball has been bowled some of the standing pins may have been moved from their normal spots or positions. When these pins are raised from the deck so that the squeegee 114 can be operated to sweep the alley clean of fallen pins, it is essential that such displaced pins be respotted in the same positions from which they have been lifted. The carriage mechanism 279 is designed to engage and lift the pins from any displaced position. When a plate 280 contacts a displaced pin, the levers 293 start closing. One of the bars 292 will engage the neck of the pin before the other bar creating a reactive force causing a shifting of the carriages along tracks 297 until both bars 292 grip the pin as shown by the dot-dash lines of Fig. 30. Further, should the displacement of the pin be along the length of bars 292, the pin is also in position to be grasped as shown by the dot-dash lines of Fig. 31. The lifting of the pins is as before described and assurance is had that said pins will be replaced on the alley deck in the positions from which they were lifted.

Means are provided to return the carriages to centered position after having been shifted by a displaced pin. Said means are shown as comprising centering cams 304 on frame 266 positioned for engagement by rollers 305 on push bars 298. When the plate 280 moves downwardly with relation to the frame 266, said rollers 305 will engage the cams 304 and be guided thereby to a central position.

Each time that a ball is rolled and causes operation of switch 106, the rack moves down for the purpose of lifting any pins that are left standing. However, the action varies according to whether none, some or all of the pins are felled. To this end, an electric circuit, as shown in Fig. 72 is provided to control the action of the rack. Each unit 277 is equipped with contacts 306 and 307 associated with a contact bar 308. The contact bar 308 is carried by a bracket 308a attached to the sleeve 290 and is initially in engagement with contacts 306 and is shifted out of engagement with contacts 306 into engagement with contacts 307 when plate 280 engages a pin. Contacts 306 and 307 are carried by brackets 306a and 307a, respectively, which are connected to yoke 284. The contacts 306 of all units 277 are connected in series to the terminals 309 and 310 and the contacts 307 are connected in a similar circuit with terminals 372. When all of the pins are felled, the circuit through all of the contacts 306 by bars 308 is not disturbed because none of the plates 280 is pressed. This causes the machine to shift into the strike cycle as will be later described. If a gutter ball is rolled and none of the pins is felled, all of the plates 280 will be pressed by the full complement of pins causing the contact bars 308 to close the circuit through contacts 307 and shift the machine into its gutter ball cycle. If one to nine pins are left standing after the first ball has been rolled, neither of these circuits is made, both being held open at those contacts 306 or 307 which are not bridged by bars 308. No change, therefore, takes place in the normal operation of the machine which is arranged for a two-ball or spare cycle of operation.

The rack carries one set of terminals 309 and 310 which are in circuit with the contacts 306 of all units 277 and a set of terminals 372 which are in circuit with the contacts 307 of all units 277. The terminals 309, 310 and 372 travel up and down with the rack and make sliding connection with the terminals 309a, 310a and 372a carried by the frame member 372b of the machine to connect the contacts 306 and 307 carried by the units 277 to the other circuit components carried by the machine framework. The terminals are in engagement between the point of downward travel of the rack at which the pressure plates 280 first engage standing pins and the point of rack travel where the pressure plates have moved upwardly relative to the rack the maximum amount as caused by engagement of the plates with pins. Because of this, the contacts 306 and 307 are not operative when the rack is in elevated position above the frame member 372b.

The valve 265 which controls the action of fluid cylinder 264, in moving the rack 112 up and down, is more clearly detailed in Fig. 36. This valve has one closed and two open positions to control flow from the pressure line 315 to either line 316 or line 317. The line 318 connects the valve with drain. The open positions deliver fluid pressure to opposite ends of said cylinder. The valve is controlled by means of solenoids 311 and 312, a gear rack 313 movable by the solenoids, and a gear 314 engaged with the gear rack. When solenoid 312 is energized, it opens the valve to deliver fluid through line 316 to move the rack down. This movement of the spotting rack controls the control bar 316a shown in Fig. 1 and detailed in Figs. 43 to 51, inclusive.

The rack frame 266 mounts a pivoted arm having fingers 317a and 317b arranged for engagement with a latch 318a on control bar 316a. This latch is of similar design to the above-described latch 289 with the exception that it is mounted in reversed or up-side-down position. The upper end of bar 316a is connected by a link 319 to a handle 320 mounted on the center of gear 314 to operate between abutments 321 and 322 on said gear. The downward movement of the rack 112 will cause finger 317a to engage latch lug 323 of latch 318a to pull control bar 316a down. This downward movement of the bar will cause the handle 320 to pick up abutment 321 causing the valve 265 to close gradually as the rack moves to its low position, slowing up the movement of the rack.

The spotting rack also carries fingers 324 flanking the side edges of a bar 325 for engagement with latch 326 on said bar. The downward movement of the spotting rack will cause the bar 325 to be pulled down by engagement of one of fingers 324 with latch lug 327 of latch 326. While the control bar 316a continues toward its low position, the spotting rack continues its movement down as shown by dot-dash lines of Fig. 44 until the pin units 277 completely attach themselves to or detach themselves from the pins. This occurs when or slightly before one of fingers 324 engages latch lug 327 if in engaging position or adjustable stop 328 on bar 325. The final movement of the rack after it picks up bar 325 causes a lug 329 on bar 325 to close switch 330 which is in circuit to energize solenoid 311 of valve 265. The switch 330 is of the delayed action or lost motion type allowing time for the rack units 277 to become latched or unlatched with pins and allows a tolerance in the stopping position of the rack to compensate for variations in the heights of the pins.

The bar 316a also carries latches 331 and 332 similar to the above described latch 289 and a stop 333. When switch 330 is closed, the spotting rack moves up causing finger 317a to engage either of the latches 331 or 332 if in engaging position or the stop 333 to raise bar 316a until handle 320 engages abutment 322 of gear 314 to rotate said gear until valve 265 is closed and the upward movement of the rack is stopped. The weight of the bar 316a is counter-balanced by a weight 334 (Fig. 9) lending to an easy operation of the parts.

A fixed bar 335 parallel to and alongside of bar 316a, is provided with a latch 336 for engagement with finger 317a. A stop 337 is provided on the frame 372b for engagement with fingers 317a and 317b. When said finger 317a engages either the latch lug of latch 336 if in engaging position or stop 337, it can tilt upwardly as shown permitting slow continued movement of the rack without completely closing valve 265. The fingers 317a and 317b are biased downwardly by a spring 317c. This spring must yield when the fingers engage the latch 336 or stop 337 since the latter members are fixed against movement. However, the latch 318a is on a yielding bar 316a and the spring 317c is sufficiently strong to prevent tilting of the fingers. The control bar 316a has only the function of causing the rack to come to a slow stop. On the downward movement of the rack, said control bar slowly closes the valve 265 and sets said valve so that solenoid 311 can initiate the upward movement of the rack when energized by closing of switch 330. Upon upward movement of control bar 316a, the valve slowly closes so that the solenoid 312 can initiate the downward movement of the rack.

When the spotting rack has delivered a set of pins to the alley deck 101, it rises until finger 317a by engaging the latch lug of latch 331 located at an intermediate elevation with respect to the deck has shifted the bar 316a to close valve 265 and cause the rack to stop at an intermediate waiting position. The next time the rack is operated, it moves down to pick up standing pins, and finger 317a disengages from latch 331 and the latter under the urging of its spring assumes the B position of Fig. 35. As the rack approaches its low position above the alley deck, a stop 338 on bar 316a is engaged by the finger 317a causing the mentioned slowing of the movement of the rack. Closing of switch 330 by fingers 324 on the rack will cause upward movement of the rack. If some of the pins on the deck, but not all of them, remain standing, said pins are picked up by the rack which moves upwardly to cause finger 317a to pick up latch 332 on bar 316a which shifts the valve 265 which then stops the rack after a short upward travel of the rack and bar 316a together. This is also an intermediate waiting position for the rack but one which is slightly above the other waiting position, i. e., above the waiting position established by latch 331. Latch 332 is only slightly above latch 331 since a too great difference in the relative positions of the latches would cause a shifting of latch 331 into the latching C position of Fig. 35 by the upward movement of finger 317a. When the rack again moves down, latch 332 under the urging of its spring falls into the B position of Fig. 35. The rack after delivering the raised pins to the alley deck in the positions from which they were lifted, rises and continues to move upward past latches 331 and 332 because they are now in the non-latching B position of Fig. 35. The fingers 317a and 317b now move past said latches until they encounter a stop 333 to shift the bar 316a upwardly by continued movement of the rack and close the valve 265 to bring the rack to a halt in its top waiting position, i. e., elevated with respect to the pin tray 111. This movement of the rack past the latches, shifts the latter from the B positions, through the D positions and to the C positions of Fig. 35. Further, during the upward movement of the rack, the finger 317b passes by latches 318a and 336 which are in the B positions and are thus shifted to the C positions ready to latch.

When the spotting rack is moved down to extract a set of pins from the tray 111, the finger 317a first engages latch 318a which pulls bar 316a down (the bar having been in its uppermost position) until said fingers engage latch 336, which is in the C position, which arrests the fingers 317a and 317b but allows the rack to continue down slowly until the pins are grasped by the units 277. When the bar 316a is in its uppermost position, the latch 318a is above latch 336. The rack does not pass beneath the latches 331 and 332 in this movement so that the rack may return to its top position without engaging these latches. The rack then moves to its top position allowing latches 318a and 336 to fall into the B positions, the rack being stopped when it encounters stop 333. The upward movement of the rack is caused by the engagement of finger 324 with latch 326 which shifts bar 325 downwardly to operate switch 330 and shift valve 265 by solenoid 311. The next downward movement of the rack is past the latches 318a and 336 shifting them through the D positions to the C positions ready for latching. As the rack fingers move downwardly past the intermediate waiting position, they move by latches 331 and 332 which remain in the latching C positions. When the rack reaches the alley deck, it slows down as before set forth, places the pins on said deck, and returns upward to be stopped at the intermediate waiting position by latch 331.

The above movements of the spotting rack are repeated for each frame of bowling except when a strike or gutter ball is rolled. When a ball is rolled in either of these excepted cases, the rack does not stop at the intermediate waiting position to hold pins while the deck is cleared of fallen pins, but continues upwardly to its top position. Accordingly, means are provided for tilting latches 331 and 332 to their B position to allow fingers 317a and 317b to pass by. This means comprises a trip lever 339 secured to a pivot pin 340 of a bracket 341 carried by bar 316a. A pulley 342 fixed on said pivot pin has a cable 343 secured thereto, said cable having its end secured to the core of a solenoid 344. When either of the mentioned circuits through the rack units 277 is closed by the absence of standing pins on the deck 101 or the presence of a full complement of ten pins, the solenoid 344 having the coils 344a and 344b is energized to shift cable 343 and thus swing trip lever 339 upward against the lugs of latches 331 and 332. The latches 331 and 332 are tilted into their B position, which permits the rack to move up to its top position.

The latch 326 on bar 325 is located at the position where the rack is to pick up pins from the tray and operates in a manner similar to latches 318a and 336, to engage fingers 324 and pull bar 325 down for closing of switch 330 when the spotting rack assumes its position to receive pins from the spotting tray 111. As the rack moves upwardly to its top position, the latch 326 is tilted to its B position. This permits fingers 324 to pass so that the rack can continue down to set a complement of pins on the alley deck. Bar 325 has a stop 328 for the purpose of changing the movement of the rack and causing it to move up again. Springs 345 are connected between the bar 325 and a fixed guide bracket 346 for said bar to raise the latter when downward pressure on it is released.

When the spotting rack moves down to place a full set of pins on the alley deck, an electric circuit is made through contacts 307 which would cause the machine to shift into the gutter ball cycle. However, this shift must not occur at this time and means are provided to prevent it. Said means is shown best in Figs. 41 and 42 and comprises a switch 347, a roller 348 on the pin spotting rack, a trigger 349 on the lever of the switch 347 and engaged by said roller, a trip arm 350 having a trigger 351, and a link 352 connecting the switch lever and the trip arm 350. The switch 347 is installed at a point between the alley and the intermediate waiting position of the rack. The trip lever 350 is installed at a point between the intermediate waiting position of the rack and the position of the rack wherein it picks up pins from the tray.

When the spotting rack moves down from its top position to deliver pins to the alley deck, trigger 351 is contacted by roller 348 and caused to open switch 347. The rack continues down with the switch in open condition. After placing a set of pins on the alley deck, the rack moves up causing roller 348 to engage trigger 349 and close the switch 347. The rack moves only to the intermediate position below trigger 351. Therefore, when the rack moves down to lift standing pins after a ball is rolled, the switch remains closed since the trigger 349 is merely swung freely by the roller 348 without actuating the switch. The mentioned circuit through contacts 307 is, therefore, closed through switch 347 if the rack should find all of the pins standing after the first ball is rolled.

As the rack completes its various movements, it is necessary for it to initiate the operation of related machine components. For this purpose, the machine is provided with switches 247 and 353 shown in Figs. 1, 52, 53, 55, 37 to 40, and 72.

Switch 353 is installed somewhat below the intermediate waiting position of the pin spotting rack so that each time the rack moves past said switch, a trigger 355 on the rack engages one of the toothed discs 356, 357 or 358 causing the switch to turn on its fixed shaft 359. Rotation of the switch is caused only when the rack moves up.

The shaft 359 is mounted between brackets 360 to provide a carriage 361 slidable laterally on a track 362. Springs 363 serve to hold the carriage in its normal spare cycle position with the disc 357 aligned for engagement by the trigger 355. Shifting of the carriage when the spotting rack records a strike or a gutter ball is obtained through the energization of one of the solenoids 364 and 365 which have their cores connected to the carriage. Thus, when solenoid 364 is energized, the carriage will be shifted on its track to align disc 356 with the actuating trigger 355 and, similarly, when solenoid 365 is energized, the carriage will be shifted to align disc 358 with said trigger. Latches 364a carried by the track 362 engage either disc 365a or 366, on the carriage, as the case may be, to hold the carriage in shifted position until released by registering one of the notches 367 in the periphery of discs 365a and 366 with its related latch 364a. Springs 363 then act to center the carriage.

The movements of the rack during a spare cycle operation, cause its trigger 355 to pass the intermediate waiting position three times; thus causing said trigger to engage three successive teeth of the six teeth of disc 357 and cause 180° or one-half rotation of said disc 357. During a strike or gutter ball cycle, the rack moves only twice past the switch to cause only two successive teeth of either disc 356 or disc 358 to be engaged by trigger 355 for a 120° or one-third rotation of the disc. Accordingly, each disc 365a and 366 is provided with three equally spaced notches 367 to allow the carriage to move to its normal spare position three times for each complete revolution of disc 356 or 358. Each notch 367 is provided with a shutter 369 on a pivot 370 and with a spring 371 normally holding said shutter aligned with its respective notch. When the carriage 361 is shifted one of the latches 364a hooks onto a shutter to hold the carriage in position until a disc is rotated. The latch 364a tilts on its pivot 364b and against its spring 364c to allow latching engagement of the latch and the shutter. As the next notch 367 approaches, the latch 364a will tilt the associated shutter aside so that releasing of said latch can be accomplished. The shutter snaps back to its normal position ready to be engaged by said latch upon a subsequent shifting of the carriage.

The gutter ball circuit connects solenoid 364 with terminals 372 (Fig. 72) so that closing of said circuit by a full set of pins on the alley deck 101, will cause energization of said solenoid and shifting of the carriage 361 to bring disc 356 into actuating alignment with trigger 355. Similarly, closing of the strike circuit by an absence of pins on the alley deck will cause solenoid 365 to be energized to shift the carriage and bring disc 358 in actuating alignment with said trigger.

Discs 356, 357 and 358 mount contact bars 373, 374 and 375, respectively, by means of spring clips 376. The fixed shaft 359 fixedly carries discs 379, 380 and 381, respectively, associated with said contact bars 373, 374 and 375. The fixed discs carry six pairs of terminals 382 positioned for bridging contact by their associated contact bars, said pairs of terminals being positioned with respect to the three positions of rotation of the discs 356, 357 and 358 to carry out the operations described hereinafter.

As the pin spotting rack 112 comes to rest in or passes its intermediate waiting position it causes operation of the squeegee 114 to clear the alley of fallen pins and causes the ball lift 105 to move down. For a spare cycle operation as controlled by the terminals 382 of disc 380, the contact bar 374 will close contacts 383 in the squeegee operating circuit and then successively contacts 384 and 385 in the ball lift lowering circuit. For a gutter ball cycle operation as controlled by the terminals of disc 379, the contact bar 373 will close the successive pairs of contacts 386 in the ball lift lowering circuit only. For a strike cycle of operation as controlled by the terminals 382 of disc 381, the contact bar 375 will close contacts 387 to operate the squeegee and then contacts 388 to lower the ball lift.

Switch 247 is somewhat similar to one of the component units of switch 353 and operates in a similar manner. Said switch comprises a toothed disc 389 rotatable on a shaft 390 which carries an associated fixed disc 391. This switch is installed slightly below the top position of the pin spotting rack which mounts a trigger 392 designed to engage a tooth of disc 389 each time the rack approaches its top position to cause said disc to turn 60° or one-sixth of a revolution. The disc 389 carries a bridging contact bar 393 for contact alternately with pairs of contacts 394 and 395 on disc 391. Thus, the first actuation of disc 389 closes the pin tray circuit to move the same to a position beneath the pin spotting rack 112; the second actuation causes retraction of the tray to its pin receiving position, and so on, alternately.

*Guard 113, squeegee 114 and pin deck cover 115*

These components of the machine operate in unison and are interconnected mechanically as shown in Figs. 1, 10, 11, 25 and 62.

The guard comprises an outwardly padded transversely arranged member 396 which is provided with lateral slide brackets 397 for sliding engagement with guide bars 398. The guard is moved between high and low positions by means of cables 399 connecting said guard with pulleys 400 on shaft 124.

The squeegee comprises a transverse board 401, movable up and down with the guard 113, and supported at either end by slide bars 402 which form part of carriages 403. Lugs 404 on board 401 interconnect the guard and squeegee for vertical movement together. Tracks 405 serve to guide the horizontal alley sweeping movement of the squeegee.

The pin deck cover consists of a pair of relatively longitudinally movable panels 406 and 407 arranged to open and close an opening 408 in ceiling 409 arranged above the pin deck to separate the mechanism thereabove from an alley area in which the ball and pins operate. The pin spotting rack 112 moves through said opening when the cover panels 406 and 407 are retracted. Similar structure for moving the panels is provided at both sides thereof. The panel 406 is connected by a bracket 410 to a cable 411 trained over idler pulleys 412 and operated by pulley 413 on operating shaft 124. The panels are interconnected by a rod 414 fixed at one end to a lug 415 on panel 406, slidable through a lug 416 on panel 407 and provided with an abutment 417 engageable with the latter lug. Rotation of shaft 124, in one direction, will cause cable 411 to first move panel 406 to a position beneath and coextensive with panel 407. Then by engagement of lugs 415 and 416, the panels will move together in the same direction to completely open opening 408. Reverse rotation of said shaft will first move panel 406. Then as abutment 417 picks up lug 416, both panels will move to cover opening 408.

As the ball lift 105 moves up and approaches its top position it initiates the operation of the next machine component in the cycle of operation. After the first ball of each frame is rolled, the rack 112 is first moved down, while, after the second ball is rolled, the squeegee 114 is first operated. A switch 418 (Figs. 58, 59 and 60) operated by a trigger 419 and alternately controlling the pin spotting rack movement controlling solenoid 312 and solenoid 420 of the squeegee operating means shown in Fig. 62, is provided. The trigger 419 is mounted on the ball lift carriage 120 and operates switch 418 for each movement of said carriage.

Switch 418 comprises six-toothed discs 421 and 422 having respectively oppositely arranged teeth and mounted for rotation on a shaft 423 carried in a base frame 424. One of said discs carries a contact bar 425 arranged for successive engagement with pairs of contacts 426 on a plate 427 fixed to shaft 423. A spring 427ᵃ serves to urge contact bar 425 into electrical engagement with said pairs of contacts and means are provided for effecting axial movement of the discs and, therefore, of the contact bar 425 to separate the latter from the pairs of contacts. As shown, said means comprises a solenoid 428, a lever 429 connected to be moved by the moving core of the solenoid and mounted on a pivot 430a, and a connection 431 between said lever and the discs whereby relative rotation between the discs and said lever may occur. A pivot 430 permits straight-line movement of lever 429.

The lever 429, at its free end, carries a pivoted catch lever 432 having a laterally extending lug 433 and held in position by a spring 434. The catch lever 432 is arranged for hooking engagement with catch 435. A trip lug 436 is mounted on ball lift carriage 120 for operative engagement with lug 433.

The switch 418 is so mounted that upon upward movement of the ball lift carriage and just before said carriage reaches its top position, the trigger 419 will encounter one of the teeth of disc 421 to turn said disc 60° or one-sixth of a revolution. Since the pairs of contacts 426 are wired alternately to close circuits to solenoids 312 and 420, the rack 112 and the squeegee 114 will be alternately operated by successive movements of the ball lift carriage 120. However, when a strike is bowled, the switch must be conditioned to operate the squeegee even though the latter had been last operated.

Solenoid 428 is connected to terminals 309 and 310 so that when the pin spotting rack 112 records a strike, said solenoid is energized to pull lever 429 to the dot-dash line position which is maintained by catch lever 432 engaged by catch 435. The discs 421 and 422 are, therefore, moved axially against the force of spring 427ᵃ to separate contact bar 425 from the pairs of contacts 426. Now, when disc 421 is turned, there is no closed operating circuit. The axial movement of discs 421 and 422 causes disc 422 to move into alignment with a trip lug 436.

When the ball lift carriage moves down, trip lug 436 engages a tooth of disc 422 to turn said disc and disc 421 back 60° and as the ball lift continues down, said trip lug encounters lug 433 to release the catch lever 432 and permit spring 427ᵃ to re-engage contact bar 425 with the aligned pair of contacts 426. Thus, the circuit previously made, and not the alternate circuit, is again made.

The squeegee operating means, shown in Fig. 62, comprises a fluid pressure valve 437 for delivering fluid under pressure from pump 243 to either the top or bottom of a hydraulic cylinder 438, said valve being controlled by solenoid 420. When said solenoid is energized it positions valve 437 to deliver fluid under pressure through line 439 to the top of cylinder 438 forcing a carriage 440, connected to the piston rod of said cylinder, down along a track 441. A belt 442, trained over spaced pulleys 443, is connected with the carriage 440 to effect rotation of a shaft 444 driven by the lower of said pulleys. This shaft is transversely mounted above and forward of the alley deck 101 and carries pulleys 445 at each side of the alley. Belts 446 trained over the latter pulleys and aligned, free running pulleys 447, are connected at 448, with squeegee carriages 403. Downward movement of carriage 440 will, therefore, move squeegee carriages 403 rearwardly along tracks 405.

The carriage 440 is provided with a bracket 449 associated with a rod 450 connected with a lever 451 movable with the valve 437. Said rod carries adjustable spaced stops 452 and 453. It is evident that rearward movement of the squeegee is arrested by closing of valve 437 when bracket 449 engages stop 452 to cause lever 451 to close said valve. An over-center spring 454 is connected to lever 451 so that when said lever is pulled down by stop 452 to close the valve, said spring will continue the movement of the lever to open the valve for conduction of fluid under pressure through line 455 to the lower end of cylinder 438. This causes return of the squeegee to its forward position where it is stopped when bracket 449 encounters stop 453 to close the valve. The valve is held closed and the spring 454 is ineffective to open it while the bracket 449 is engaged with stop 453.

Each time that the squeegee returns to its normal starting position, it causes or initiates the next operation of the machine. Normally, the pin spotting rack 112 then moves down to re-set pins lifted from the pin deck. In the event of a strike, the squeegee does not start any further operation because the pin spotting rack moves to its top position to receive another set of pins from the pin tray 111. The latter, upon its return to pin receiving position controls the downward movement, through the medium of described switch 256 (Fig. 61), of the pin filled spotting rack as above set forth.

Switch means 456, detailed in Figs. 56 and 57 are provided for initiating operation of the pin spotting rack 112 when a strike is not bowled. Said means is connected to control solenoid 312 of valve 265.

The switch means 456 comprises a switch 457 mounted on a pivoted plate 458 which is held by a catch 459 against the force of a spring 460 seeking to lift said plate and the switch thereon. A solenoid 461 controls the catch. A bell-crank lever 462 has a roller 463 engaged with the plate 458 and an arm 464 adapted to be disposed in the path of movement of a trigger 465. The latter is also adapted to actuate switch arm 466. The trigger is carried by one of the squeegee carriages 403.

After the squeegee has cleared the alley deck and as it starts its return movement, trigger 465 moves switch arm 466 to close switch 457 and cause the pin spotting rack 112 to move down to replace pins lifted from said deck. However, when a strike is recorded, solenoid 461 which is connected in the strike circuit, is energized releasing catch 459 from engagement with plate 458 and permitting spring 460 to become effective to lift said plate and switch 457 thereon and thus move switch arm 466 out of the path of trigger 465. When the plate 458 is lifted, its engagement with roller 463 will rock arm 464 into the line of movement of trigger 465. Consequently, the return movement of carriage 403 will not cause closing of switch 457, but the trigger 465 will rock bell-crank lever 462 to cause it to restore the switch 457 to its low position where its switch arm 466 can be actuated upon a subsequent movement of the squeegee.

The wiring diagram (Fig. 72) shows all of the switches of the machine connected in the positive line of the circuit while all of the solenoids or coils are connected in the negative line. All of the contacts 306 of the spotting rack are arranged in series with terminals 309 and 310 and coil 461, and all of the contacts 307 are in series with terminals 372 and with switch 347. Terminal 309 is connected directly to the positive line and terminal 310 is connected to the negative line through coil 344a of solenoid 344 and solenoids 365, 461, 259 and 428 so that when all of contacts 306 are closed, said solenoids are energized. One terminal 372 through switch 347 is connected directly to the positive line and the other terminal 372 is connected to the negative line through coil 344b of solenoid 344 and solenoids 311 and 364 so that when all of contacts 307 are closed, said solenoids are energized. Switches 418, 256, 255 and 457 are connected in parallel with solenoid 312 so that closing of any one of said switches will energize solenoid 312. Switches 418, 380 and 381 are connected in parallel with solenoid 420. Switch 247 is connected to operate solenoids 245 and 246, alternatively. Switches 159a, 159b and 467 are connected in parallel with solenoid 138. Switches 379, 380 and 381 are connected in parallel with solenoid 139. Switch 467 is located at the head of the alley to operate the machine without rolling a ball.

*Ball delivery mechanism 116*

Figs. 63 through 71 detail this mechanism which comprises an important component in the present combination but which, essentially, comprises an independent unit not affecting the operation of the other components of the machine. As stated, the mechanism is designed to receive balls from adjacent alleys and to return them to a bowler on a common return track of conventional design located between adjacent side boards 468. An opening 469 is made near the top of each side board large enough to pass a ball from ball lifting rollers 125 to the space provided between side boards. A door 470 is provided for normally closing each opening. The doors are mounted to slide vertically on tracks 471 and when raised allow the passage of a ball through the associated opening 469. Means are provided to receive a ball passing through either opening 469 and to lift it to a higher level.

Said means comprises a conveyor 472 having a bottom shaft 473 carrying spaced sprockets 474 and mounted in bearings 475 secured on the facing sides of the side boards 468. Side supports 476 extend upwardly from said facing sides of the side boards on opposite sides of the conveyor. Sprockets 474 are located below the openings 469 and a second shaft 477 carrying sprockets 478 is positioned in elevated relation to said openings in bearings 478a carried by the side supports. Chains 479 are trained around the spaced pairs of sprockets 474 and 478.

The motor 244 is connected to drive the conveyor 472 by means of a worm and worm wheel drive 480 turning a shaft 481 which, in turn, through the medium of a one-direction driving pulley 482 and belt 483, drives a pulley 484 on shaft 477. Each of the alleys involved effects a drive of the conveyor 472.

The conveyor chains 479 mount a pair of lifting brackets 485 by means of transverse rods 486. Each bracket is provided with rollers 487 on the ends of rods 486, said rollers being guided in vertical tracks 488 at the front and rear edges of the side supports 476. The brackets are normally tiltable on their rods 486 but said brackets are held against tilting by a roller 489 on each bracket engaged with a cam track 490. Said cam track, near its upper end, is formed with a recess 491. Each bracket 485 is also provided with a rod 492 on the end of the bracket opposed to the roller 489.

It will be evident that lifting of door 470 will permit a ball to come to rest upon one of brackets 485 and that movement of the conveyor will elevate the bracket and ball. The ball may ride along side boards 468 in its elevating movement. When the roller 489, aided by the weight of the ball, finds cam recess 491, the bracket will tilt to aid the ball in rolling onto the ball return track 493.

Each bracket 485 serves one alley only. The part of the ball lifting mechanism operable in conjunction with a ball received from one alley and with one of the brackets 485 is actuated by a catch block 494 mounted on one side of the other bracket 485 which is moving in its downward non-ball lifting stroke. The part of the ball lifting mechanism operable in conjunction with a ball received from the other alley and said other bracket 485 is actuated by a catch block 494 on the side of the first bracket 485 when it is in its downward non-ball lifting stroke. The catch blocks 494 are on opposite sides, with respect to each other, of their respective brackets 485. It will thus be seen that a ball received from one alley is lifted by one bracket 485 and associated mechanism, the latter being controlled by the catch block on the other bracket. The mechanism is arranged to operate for one alley continually should the other alley be idle since either alley drives the conveyor 472. The ball to be elevated controls the mechanism for return delivery thereof.

A bell-crank 495 pivoted at 496 is arranged adjacent each opening 469. Each lever is connected to a push rod 497 carrying a trip lug 498 for engagement with the operating arm 499 of a switch 500. A solenoid 501 is connected in the circuit to be energized when the switch is closed. As seen more clearly in Figs. 67 and 68, the solenoid controls the rotation of a ratchet 502 through the medium of a gear and rack unit 503 connected to the core of said solenoid, the action of said core being opposed by a spring 504. Each ratchet 502 comprises a fixed member 505 having ratcheting engagement with a member 506 keyed to a vertical stem 507 arranged alongside of the rear guide 488. The stem is axially movable through the ratchet, the members of which are urged toward each other by a spring 508 around the stem and held by an abutment 509. By this arrangement, energizing of solenoid 501 will cause the gear means 503 to turn ratchet member 506 one-quarter turn to effect a similar motion of stem 507.

A lug 510 is provided on each stem for engagement by its related catch block 494 which is adapted to depress the lug 510 and thereby depress stem 507 in its guide bearings 511. A cable connection 512, trained over pulleys 513 is made between each stem 507 and its associated door 470. A compression spring 514 mainly residing in a sleeve 515 on the frame of tracks 471 serves to counteract the pull of cable 512.

When a ball is brought by ball lift 105 to a position against the sliding door 470 of its alley, the short arm 516 of bellcrank 495 is engaged by the ball to raise push rod 497 and to bring the long arm 517 down against the rear of the ball. The trip lug 498 will be moved up to effect closing of switch 500 and energization of solenoid 501. The resultant movement of the gear and rack means 503 will cause a quarter turn of stem 507 which is now held in turned position by the ratchet 502 and thus holds lug 510 in position as shown in Figs. 68, 70 and 71 to be engaged by the catch block 494 on the same side of a bracket 485 as lug 510. Depression of the stem sufficient to raise door 470 follows. A bracket 518 on the door engages a block 519 on push rod 497 to exert an upward force on said rod and thus cause the long arm 517 of the bell-crank to roll the ball onto ledge 520 of side board 468 in position to be picked up by the next bracket 485 moving upward.

Since each alley is provided with a separate ball delivery mechanism, the doors are caused to open alternately by alternate ball lifting brackets. Therefore, if the balls of both alleys arrive at the same time against their doors and operate their respective switches simultaneously, the doors will be opened in timed relation as determined by the catch blocks 494 on each of the brackets 485 which are positioned on opposite sides of the bracket 485 for engagement with their respective lugs 510.

At the low position of the stem 507, a collar 521 on said stem depresses sleeve 522 of the movable ratchet member 506 to release said member from engagement with the fixed member 505. The spring 504 can now restore the stem 507 to its initial position with the lug 510 out of the path of movement of the catch block 494. The spring 514 is now effective to close the door 470 and simultaneously raise the stem 507. The push rod 497 is thus released and the bell-crank 495 can now return to ball receiving position.

From the above described embodiment of the invention, it will be seen that the ball lift 105, the pin sorting means 107 and the pin lifting conveyor 108, operate continually for the purpose of returning the ball and for bringing pins to the magazine 110. The pin magazine is self-operated by dropping of pins into it but its energy is provided through the movement of the pin tray 111. The machine is designed to handle two sets or twenty pins, one set being in play while the other is being handled by the machine.

The remaining components of the machine can be included in four related groups or units, the elements of said units operating synchronously. One group which may be called the ball lifting group, consists of the ball lift 105, the squeegee 114 (in its vertical motion only), the guard 113 and the pin deck cover 115. A second group comprises, the squeegee (in its alley sweeping movement) and its connected mechanism. A third group comprises the pin tray 111 and its associated parts. A fourth group comprises the pin setting or spotting rack 112.

The components of the first group have two definite stop positions. When the ball lift 105 is down, the guard 113 and squeegee 114 are up and the pin deck cover 115 is closed. Reversely, when the ball lift is up, the guard and squeegee are down and the pin deck cover is open.

The squeegee has one definite stop position in front of the pin deck from which it moves rearwardly toward the pit 103 and then back to its initial position.

The pin tray has two definite positions. They are the loading position beneath magazine 110 and the pin delivery position beneath the pin spotting rack 112 and above the pin deck 101.

The pin spotting rack has four stop positions, namely, intermediate waiting position, top waiting position, tray or pin extracting position, and alley or pin spotting position.

Reference is now made to Figs. 73, 74 and 75 showing, diagrammatically, the actions of said four groupings of the machine.

The machine is designed to operate for a normal two-ball cycle which is shown in Fig. 73. When a ball is rolled and fells one to nine pins, the sequence of operation is as follows:

1. The ball lift 105 rises.
   The pin deck cover 115 opens.
   The guard 113 descends.
2. The rack 112 picks up standing pins.
3. The squeegee 114 sweeps the alley and returns.
4. The rack 112 replaces lifted pins on the pin deck and returns to its top waiting position.
5. The pin deck cover 115 closes.
   The guard 113 and the squeegee 114 rise.
   The ball lift 105 descends.
6. The tray 111 moves to position beneath the rack 112.
7. The rack 112 descends.
   The rack 112 extracts pins from the tray 111.
8. The tray 111 returns to loading position. (The machine now waits for the second ball.)
9. The ball lift 105 rises.
   The squeegee 114 and the guard 113 descend.
   The pin deck cover 115 opens.
10. The squeegee 114 sweeps the alley and returns.
11. The rack 112 places a set of pins on the alley deck and returns to intermediate waiting position.
12. The squeegee 114 and guard 113 ascend.
    The ball lift 105 descends.
    The pin deck cover 115 closes.

When a strike is made and all of the pins are felled by one ball, the action as shown in Fig. 74, is as follows:

1. The ball lift ascends.
   The pin deck cover opens.
   The squeegee and the guard descend.
2. The rack descends, finds no standing pins and ascends to its top waiting position.
3. The squeegee sweeps the alley and returns.
4. The tray moves to position beneath the rack.
5. The rack extracts pins from the tray and moves to its top position.
6. The tray returns to loading position.
7. The rack moves down to deposit pins on the alley and returns to intermediate waiting position.
8. The ball lift descends.
   The pin deck cover closes.
   The squeegee and the guard ascend.

When a gutter ball is rolled and all of the pins are left standing, the action is as shown in Fig. 75:

1. The ball lift rises.
   The pin deck cover opens.
   The squeegee and the guard descend.
2. The rack descends and finding all of the pins standing ascends to its top waiting position.
3. The ball lift descends.
   The pin deck cover closes.
   The squeegee and the guard ascend.
4. The tray moves to position beneath the rack.
5. The rack extracts pins from the tray and moves to its top position.
6. The tray returns to its loading position. (The machine now waits for the second ball.)
7. The ball lift rises.
   The pin deck cover opens.
   The squeegee and the guard descend.
8. The squeegee sweeps the alley and returns.
9. The rack places a set of pins on the alley and moves to intermediate position.
10. The ball lift descends.
    The pin deck cover closes.
    The squeegee and the guard ascend.

While we have illustrated and described what we now regard as the preferred embodiment of our invention, the construction is, of course, subject to modifications without departing from the spirit and scope of our invention. We, therefore, do not wish to restrict ourselves to the particular forms of construction illustrated and described, but desire to avail ourselves of all modifications that may fall within the scope of the appended claims.

Having thus described our invention, what we claim and desire to secure by Letters Patent is:

1. In a bowling pinsetting machine for use with a pin deck adapted to have a full complement of pins thereon, said machine having mechanical means for gathering pins and means for lifting pins from the pin deck, interrelated machine components operatively arranged normally to effect a spare cycle two-ball operation wherein standing pins are lifted from the pin deck after a first ball has been rolled, and a control circuit comprising ten normally open switches in series each arranged to be closed by a standing pin, means responsive to said circuit when closed, upon none of the pins being felled, to shift the machine into a gutter ball cycle operation wherein said pin lifting means are disabled and pins are left standing after a first ball has been rolled.

2. In a bowling pinsetting machine for use with a pin deck having a full complement of pins thereon, said machine having mechanical means for gathering pins and means for lifting pins from the pin deck and for setting pins thereon, interrelated machine components arranged normally to effect a spare cycle two-ball operation wherein standing pins are lifted from the pin deck after a first ball has been rolled, means for causing said machine to effect a strike cycle one-ball operation wherein a different complement of pins are set on the pin deck after a first ball has been rolled, means for causing said machine to effect a gutter ball cycle operation wherein pins are left standing after a first ball has been rolled, a control circuit including ten normally closed pin operated switches connected in series for actuating said means to cause said machine to shift into said strike cycle in the event no pins are standing after the rolling of a first ball, and a control circuit comprising ten normally open switches connected in series and each adapted to be actuated by a standing pin for actuating said means for causing said machine to shift into a gutter ball cycle in the event all pins are standing after the rolling of a first ball.

3. A bowling pin setting machine for use with an alley bed having a pin deck and a pit at the rear thereof, comprising a ball lift for raising balls out of said pit, means for clearing the deck of playing objects, mechanical means for gathering pins from said pit, a pin handling rack movable between raised and lowered positions, and control apparatus prearranged normally to operate said ball lift after the rolling of a ball, cause said rack to move to its lowered position and grasp and lift pins left standing on said deck after the rolling of said ball, operate said deck clearing means, cause said rack to move to its lowered position, replace the lifted pins onto the pin deck and move to its raised position, lower said lift, supply said rack with a set of pins from said pin gathering means, and cause said machine to cease operation, said control apparatus including a normally open circuit having ten series-connected switches each arranged to be closed by a separate standing pin, and said control apparatus including means operable upon closure of said circuit in the event no pins are felled by said ball to shift the machine from its normal operating cycle and to cause said rack to move to and remain in its raised position without lifting standing pins and to prevent said deck clearing means from operating.

4. In a bowling pinsetting machine for use with a pin deck having a full complement of pins thereon, said machine having mechanical means for gathering pins and means for lifting pins from the pin deck and for setting pins thereon, interrelated machine components arranged normally to effect a spare cycle two-ball operation wherein standing pins are lifted from the pin deck after a first ball has been rolled, means for causing said machine to effect a strike cycle one-ball operation wherein a different complement of pins are set on the pin deck after a first ball has been rolled, means for causing said machine to effect a gutter ball cycle operation wherein pins are left standing after a first ball has been rolled, a control circuit including a plurality of normally closed pin operated switches connected in series for actuating said means to cause said machine to shift into said strike cycle in the event no pins are standing after the rolling of a first ball, and a control circuit comprising a plurality of normally open switches connected in series and each adapted to be actutaed by a standing pin for actuating said means for causing said machine to shift into a gutter ball cycle in the event all pins are standing after the rolling of a first ball.

References Cited in the file of this patent

UNITED STATES PATENTS

| Number | Name | Date |
|---|---|---|
| 809,245 | Brinkmyer | Jan. 2, 1906 |
| 1,100,953 | Bujewski | June 23, 1914 |
| 1,557,177 | Lorenz et al. | Oct. 13, 1925 |
| 1,615,064 | Bishop | Jan. 18, 1927 |
| 1,736,011 | Olson | Nov. 19, 1929 |
| 2,242,069 | Heiniger | May 13, 1941 |
| 2,250,503 | Rundell | July 29, 1941 |
| 2,341,475 | Parra et al. | Feb. 8, 1944 |
| 2,341,476 | Parra et al. | Feb. 8, 1944 |
| 2,353,189 | Rundell | July 11, 1944 |
| 2,383,017 | Rundell | Aug. 21, 1945 |
| 2,388,708 | Bates | Nov. 13, 1945 |